US011412501B2

(12) United States Patent
Zhou et al.

(10) Patent No.: US 11,412,501 B2
(45) Date of Patent: Aug. 9, 2022

(54) CAPABILITY-BASED DETERMINATION OF A SHARED DATA CHANNEL TCI STATE

(71) Applicant: QUALCOMM Incorporated, San Diego, CA (US)

(72) Inventors: Yan Zhou, San Diego, CA (US); Tao Luo, San Diego, CA (US)

(*) Notice: Subject to any disclaimer, the term of this patent is extended or adjusted under 35 U.S.C. 154(b) by 51 days.

(21) Appl. No.: 17/003,502

(22) Filed: Aug. 26, 2020

(65) Prior Publication Data

US 2021/0084624 A1 Mar. 18, 2021

Related U.S. Application Data

(60) Provisional application No. 62/900,180, filed on Sep. 13, 2019.

(51) Int. Cl.
*H04W 72/04* (2009.01)
*H04W 72/14* (2009.01)

(52) U.S. Cl.
CPC ..... *H04W 72/042* (2013.01); *H04W 72/0446* (2013.01); *H04W 72/14* (2013.01)

(58) Field of Classification Search
CPC ........... H04W 72/042; H04W 72/0446; H04W 72/14; H04W 88/08; H04W 88/02; H04W 72/1289; H04W 72/1268; H04B 7/0617; H04B 7/0626

See application file for complete search history.

(56) References Cited

U.S. PATENT DOCUMENTS

| 9,729,295 | B2* | 8/2017 | Zhang | H04L 1/1861 |
| 10,951,359 | B2* | 3/2021 | Huang | H04L 5/0053 |
| 2013/0156003 | A1* | 6/2013 | Liang | H04L 1/1671 370/330 |
| 2013/0294318 | A1* | 11/2013 | Amerga | H04W 4/06 370/312 |
| 2018/0332605 | A1* | 11/2018 | Pelletier | H04W 72/1242 |

OTHER PUBLICATIONS

International Search Report and Written Opinion—PCT/US2020/048118—ISA/EPO—dated Nov. 30, 2020.

* cited by examiner

*Primary Examiner* — Wei Zhao

(57) ABSTRACT

Methods, systems, and devices for wireless communications are described. A base station and a user equipment (UE) with a defined capability may communicate using beamformed wireless communications. The defined capability may be that the UE may support fewer activated physical downlink shared channel (PDSCH) transmission configuration indicator (TCI) states than activated control resource set (CORESET) TCI states. The defined capability UE and the base station may implement techniques to determine which TCI state to use when the UE supports fewer activated PDSCH TCI states than activated CORESET TCI states. The UE may use an activated PDSCH TCI state selected by a media access control (MAC) control element (CE), an activated TCI state of a specific CORESET, a TCI indicated in scheduling downlink control information, or an activated PDSCH TCI state selected by a radio resource control (RRC) message.

30 Claims, 18 Drawing Sheets

CAPABILITY-BASED DETERMINATION OF A SHARED DATA CHANNEL TCI STATE

CROSS-REFERENCE TO RELATED APPLICATION

This Patent Application claims priority to U.S. Provisional Patent Application No. 62/900,180, filed on Sep. 13, 2019, entitled "CAPABILITY-BASED DETERMINATION OF A SHARED DATA CHANNEL TCI STATE," and assigned to the assignee hereof. The disclosure of the prior Application is considered part of and is incorporated by reference in this Patent Application.

BACKGROUND

The following relates generally to wireless communications, and to capability-based determination of a shared data channel transmission configuration indicator (TCI) state.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems (e.g., NR systems) may operate in frequency ranges associated with beamformed transmissions between wireless devices, for example, transmissions in millimeter wave (mmW) frequency ranges. These transmissions may be associated with increased signal attenuation (e.g., path loss) as compared to transmissions in non-mmW frequency ranges. As a result, signal processing techniques such as beamforming may be used to combine energy coherently and to overcome path losses. In some cases, a user equipment (UE) and a base station may communicate using beamformed transmissions. The base station may transmit to the UE using a directional transmit beam, and the UE may attempt to receive the transmission using a directional receive beam. Conventional solutions for determining directional transmit beams and directional receive beams are deficient.

SUMMARY

The described techniques relate to improved methods, systems, devices, or apparatuses that support a capability-based determination of a shared data channel transmission configuration indicator (TCI) state. Generally, the described techniques enable a selection of a physical downlink shared channel (PDSCH) TCI state from among a set of different PDSCH TCI states based on a capability of the UE to support a number of TCI states and a number of control resource set (CORESET) TCI states. In an example, a base station and a UE may be configured for beamformed wireless communications. The base station may transmit a downlink transmission to a UE using a directional transmit beam, and the UE may attempt to receive the downlink transmission via a receive beam. Each transmit and receive beam may have an associated transmission configuration indicator (TCI) state to indicate different sets of beamforming parameters. A TCI state may be associated with a number of spatial parameters and may correspond to analog receive beamforming parameters of a receive beam at the UE. The TCI state may, for example, indicate a downlink transmission beam based on antenna port quasi co-location (QCL) information. By the base station indicating a TCI state of a transmit beam, the UE may use the indicated TCI state to select an activated TCI state for a receive beam from a set of TCI states.

In some examples, the UE may have a defined capability (e.g., may operate in a reduced capability state). For example, the UE may support two activated CORESET TCI states and one activated PDSCH TCI state. As a defined capability UE, the UE may support fewer activated TCI states for PDSCH than for the CORESET. The defined capability UE and a serving base station may implement techniques to determine which TCI state to use when the UE supports fewer activated PDSCH TCI states than activated CORESET TCI states. In an example, the UE may use a TCI state selected by a media access control (MAC) control element (CE) as the activated PDSCH TCI state. In another example, the UE may use the TCI state of a specific CORESET as the activated PDSCH TCI state. In some examples, the UE may use a TCI state indicated in scheduling downlink control information (DCI) as the activated PDSCH TCI state. Or, in another example, the UE may use a PDSCH TCI state selected by a radio resource control (RRC) message as the activated PDSCH TCI state.

A method of wireless communication by a UE is described. The method may include identifying a capability of the UE to support a number of physical downlink shared channel (PDSCH) transmission configuration indicator (TCI) states and a number of control resource set (CORESET) TCI states; selecting, using a technique of two or more techniques, a first PDSCH TCI state among a plurality of different PDSCH TCI states based at least in part on the identified capability, the two or more techniques comprising: a first technique for selecting the first PDSCH TCI state based at least in part on a message received from a base station, and a second technique for selecting the first PDSCH TCI state to follow a TCI state or be quasi co-located with a CORESET configured for the UE; and monitoring for a downlink transmission on a downlink data receive beam corresponding to the first PDSCH TCI state.

An apparatus for wireless communication by a UE is described. The apparatus may include a processor, memory in electronic communication with the processor, and instructions stored in the memory. The instructions may be executable by the processor to cause the apparatus to identify a capability of the UE to support a number of PDSCH TCI states and a number of CORESET TCI states; select, using a technique of two or more techniques, a first PDSCH TCI state among a plurality of different PDSCH TCI states based at least in part on the identified capability, the two or more techniques comprising: a first technique for selecting the first PDSCH TCI state based at least in part on a message received from a base station, and a second technique for selecting the first PDSCH TCI state to follow a TCI state or be quasi co-located with a CORESET configured for the UE;

and monitor for a downlink transmission on a downlink data receive beam corresponding to the first PDSCH TCI state.

Another apparatus for wireless communication by a UE is described. The apparatus may include means for identifying a capability of the UE to support a number of PDSCH TCI states and a number of CORESET TCI states; means for selecting, using a technique of two or more techniques, a first PDSCH TCI state among a plurality of different PDSCH TCI states based at least in part on the identified capability, the two or more techniques comprising: a first technique for selecting the first PDSCH TCI state based at least in part on a message received from a base station, and a second technique for selecting the first PDSCH TCI state to follow a TCI state or be quasi co-located with a CORESET configured for the UE; and means for monitoring for a downlink transmission on a downlink data receive beam corresponding to the first PDSCH TCI state.

A non-transitory computer-readable medium storing code for wireless communication by a UE is described. The code may include instructions executable by a processor to identify a capability of the UE to support a number of PDSCH TCI states and a number of CORESET TCI states; select, using a technique of two or more techniques, a first PDSCH TCI state among a plurality of different PDSCH TCI states based at least in part on the identified capability, the two or more techniques comprising: a first technique for selecting the first PDSCH TCI state based at least in part on a message received from a base station, and a second technique for selecting the first PDSCH TCI state to follow a TCI state or be quasi co-located with a CORESET configured for the UE; and monitor for a downlink transmission on a downlink data receive beam corresponding to the first PDSCH TCI state.

A method of wireless communication at a base station is described. The method may include receiving a capability indicator of a capability of a UE to support a number of PDSCH TCI states and a number of CORESET TCI states; determining whether to indicate to the UE a first PDSCH TCI state among a plurality of different PDSCH TCI states, the first PDSCH TCI state being based at least in part on the capability; responsive to a determination to indicate to the UE the first PDSCH TCI state, transmitting a message to the UE to indicate the first PDSCH TCI state, or responsive to a determination not to indicate to the UE the first PDSCH TCI state, selecting the first PDSCH TCI state to follow a TCI state or be quasi co-located with a CORESET configured for the UE; and transmitting a downlink transmission on a downlink data transmission beam corresponding to the first PDSCH TCI state.

An apparatus for wireless communication at a base station is described. The apparatus may include a processor, memory in electronic communication with the processor, and instructions stored in the memory. The instructions may be executable by the processor to cause the apparatus to receive a capability indicator of a capability of a UE to support a number of PDSCH TCI states and a number of CORESET TCI states; determine whether to indicate to the UE a first PDSCH TCI state among a plurality of different PDSCH TCI states, the first PDSCH TCI state being based at least in part on the capability; responsive to a determination to indicate to the UE the first PDSCH TCI state, transmit a message to the UE to indicate the first PDSCH TCI state, or responsive to a determination not to indicate to the UE the first PDSCH TCI state, select the first PDSCH TCI state to follow a TCI state or be quasi co-located with a CORESET configured for the UE; and transmit a downlink transmission on a downlink data transmission beam corresponding to the first PDSCH TCI state.

Another apparatus for wireless communication at a base station is described. The apparatus may include means for receiving a capability indicator of a capability of a UE to support a number of PDSCH TCI states and a number of CORESET TCI states; means for determining whether to indicate to the UE a first PDSCH TCI state among a plurality of different PDSCH TCI states, the first PDSCH TCI state being based at least in part on the capability; means for transmitting a message to the UE to indicate the first PDSCH TCI state responsive to a determination to indicate to the UE the first PDSCH TCI state, or means for selecting the first PDSCH TCI state to follow a TCI state or be quasi co-located with a CORESET configured for the UE responsive to a determination not to indicate to the UE the first PDSCH TCI state; and means for transmitting a downlink transmission on a downlink data transmission beam corresponding to the first PDSCH TCI state.

A non-transitory computer-readable medium storing code for wireless communication at a base station is described. The code may include instructions executable by a processor to receive a capability indicator of a capability of a UE to support a number of PDSCH TCI states and a number of CORESET TCI states; determine whether to indicate to the UE a first PDSCH TCI state among a plurality of different PDSCH TCI states, the first PDSCH TCI state being based at least in part on the capability; responsive to a determination to indicate to the UE the first PDSCH TCI state, transmit a message to the UE to indicate the first PDSCH TCI state, or responsive to a determination not to indicate to the UE the first PDSCH TCI state, select the first PDSCH TCI state to follow a TCI state or be quasi co-located with a CORESET configured for the UE; and transmit a downlink transmission on a downlink data transmission beam corresponding to the first PDSCH TCI state.

In some aspects, a method of wireless communication performed by a UE includes: identifying a capability of the UE to support a number of PDSCH transmission configuration indicator (TCI) states and a number of control resource set (CORESET) TCI states; determining whether a message for PDSCH TCI state activation has been received; selecting a first PDSCH TCI state among a plurality of different PDSCH TCI states based at least in part on the identified capability and based at least in part on determining whether the message has been received, wherein: the PDSCH TCI state indicated in the message is selected as the first PDSCH TCI state if the message has been received, and the first PDSCH TCI state is selected to follow a TCI state of a CORESET configured for the UE or be quasi co-located with the CORESET configured for the UE if the message has not been received; and monitoring for a downlink transmission on a downlink data receive beam corresponding to the first PDSCH TCI state.

In some aspects, a method for wireless communication performed by a base station includes: receiving a capability indicator of a capability of a user equipment (UE) to support a number of physical downlink shared channel (PDSCH) transmission configuration indicator (TCI) states and a number of control resource set (CORESET) TCI states; determining whether to indicate to the UE a first PDSCH TCI state among a plurality of different PDSCH TCI states, the first PDSCH TCI state being based at least in part on the capability; responsive to a determination to indicate to the UE the first PDSCH TCI state, transmitting a message to the UE to indicate the first PDSCH TCI state, or responsive to a determination not to indicate to the UE the first PDSCH TCI state, selecting the first PDSCH TCI state to follow a TCI state or be quasi co-located with a CORESET configured for the UE; and transmitting a downlink transmission on a downlink data transmission beam corresponding to the first PDSCH TCI state.

In some aspects, a user equipment (UE) for wireless communication includes: a memory; and one or more processors operatively coupled to the memory, the memory and the one or more processors configured to: identify a capability of the UE to support a number of physical downlink shared channel (PDSCH) transmission configuration indicator (TCI) states and a number of control resource set (CORESET) TCI states; determine whether a message for PDSCH TCI state activation has been received; select a first PDSCH TCI state among a plurality of different PDSCH TCI states based at least in part on the identified capability and based at least in part on determining whether the message has been received, wherein: the PDSCH TCI state indicated in the message is selected as the first PDSCH TCI state if the message has been received, and the first PDSCH TCI state is selected to follow a TCI state of a CORESET configured for the UE or be quasi co-located with the CORESET configured for the UE if the message has not been received; and monitor for a downlink transmission on a downlink data receive beam corresponding to the first PDSCH TCI state.

In some aspects, a base station for wireless communication includes: a memory; and one or more processors operatively coupled to the memory, the memory and the one or more processors configured to: receive a capability indicator of a capability of a user equipment (UE) to support a number of physical downlink shared channel (PDSCH) transmission configuration indicator (TCI) states and a number of control resource set (CORESET) TCI states; determine whether to indicate to the UE a first PDSCH TCI state among a plurality of different PDSCH TCI states, the first PDSCH TCI state being based at least in part on the capability; responsive to a determination to indicate to the UE the first PDSCH TCI state, transmit a message to the UE to indicate the first PDSCH TCI state, or responsive to a determination not to indicate to the UE the first PDSCH TCI state, select the first PDSCH TCI state to follow a TCI state or be quasi co-located with a CORESET configured for the UE; and transmit a downlink transmission on a downlink data transmission beam corresponding to the first PDSCH TCI state.

In some aspects, a non-transitory computer-readable medium storing a set of instructions for wireless communication includes: one or more instructions that, when executed by one or more processors of a UE, cause the UE to: identify a capability of the UE to support a number of physical downlink shared channel (PDSCH) transmission configuration indicator (TCI) states and a number of control resource set (CORESET) TCI states; determine whether a message for PDSCH TCI state activation has been received; select a first PDSCH TCI state among a plurality of different PDSCH TCI states based at least in part on the identified capability and based at least in part on determining whether the message has been received, wherein: the PDSCH TCI state indicated in the message is selected as the first PDSCH TCI state if the message has been received, and the first PDSCH TCI state is selected to follow a TCI state of a CORESET configured for the UE or be quasi co-located with the CORESET configured for the UE if the message has not been received; and monitor for a downlink transmission on a downlink data receive beam corresponding to the first PDSCH TCI state.

In some aspects, a non-transitory computer-readable medium storing a set of instructions for wireless communication includes: one or more instructions that, when executed by one or more processors of a base station, cause the base station to: receive a capability indicator of a capability of a user equipment (UE) to support a number of physical downlink shared channel (PDSCH) transmission configuration indicator (TCI) states and a number of control resource set (CORESET) TCI states; determine whether to indicate to the UE a first PDSCH TCI state among a plurality of different PDSCH TCI states, the first PDSCH TCI state being based at least in part on the capability; responsive to a determination to indicate to the UE the first PDSCH TCI state, transmit a message to the UE to indicate the first PDSCH TCI state, or responsive to a determination not to indicate to the UE the first PDSCH TCI state, select the first PDSCH TCI state to follow a TCI state or be quasi co-located with a CORESET configured for the UE; and transmit a downlink transmission on a downlink data transmission beam corresponding to the first PDSCH TCI state.

In some aspects, an apparatus (e.g., a UE) for wireless communication includes: means for identifying a capability of the apparatus to support a number of PDSCH transmission configuration indicator (TCI) states and a number of control resource set (CORESET) TCI states; means for determining whether a message for PDSCH TCI state activation has been received; means for selecting a first PDSCH TCI state among a plurality of different PDSCH TCI states based at least in part on the identified capability and based at least in part on determining whether the message has been received, wherein: the PDSCH TCI state indicated in the message is selected as the first PDSCH TCI state if the message has been received, and the first PDSCH TCI state is selected to follow a TCI state of a CORESET configured for the apparatus or be quasi co-located with the CORESET configured for the apparatus if the message has not been received; and means for monitoring for a downlink transmission on a downlink data receive beam corresponding to the first PDSCH TCI state.

In some aspects, an apparatus (e.g., a base station) for wireless communication includes: means for receiving a capability indicator of a capability of a user equipment (UE) to support a number of physical downlink shared channel (PDSCH) transmission configuration indicator (TCI) states and a number of control resource set (CORESET) TCI states; means for determining whether to indicate to the UE a first PDSCH TCI state among a plurality of different PDSCH TCI states, the first PDSCH TCI state being based at least in part on the capability; responsive to a determination to indicate to the UE the first PDSCH TCI state, means for transmitting a message to the UE to indicate the first PDSCH TCI state, or responsive to a determination not to indicate to the UE the first PDSCH TCI state, means for selecting the first PDSCH TCI state to follow a TCI state or be quasi co-located with a CORESET configured for the UE; and means for transmitting a downlink transmission on a downlink data transmission beam corresponding to the first PDSCH TCI state.

DETAILED DESCRIPTION

Figure 1:
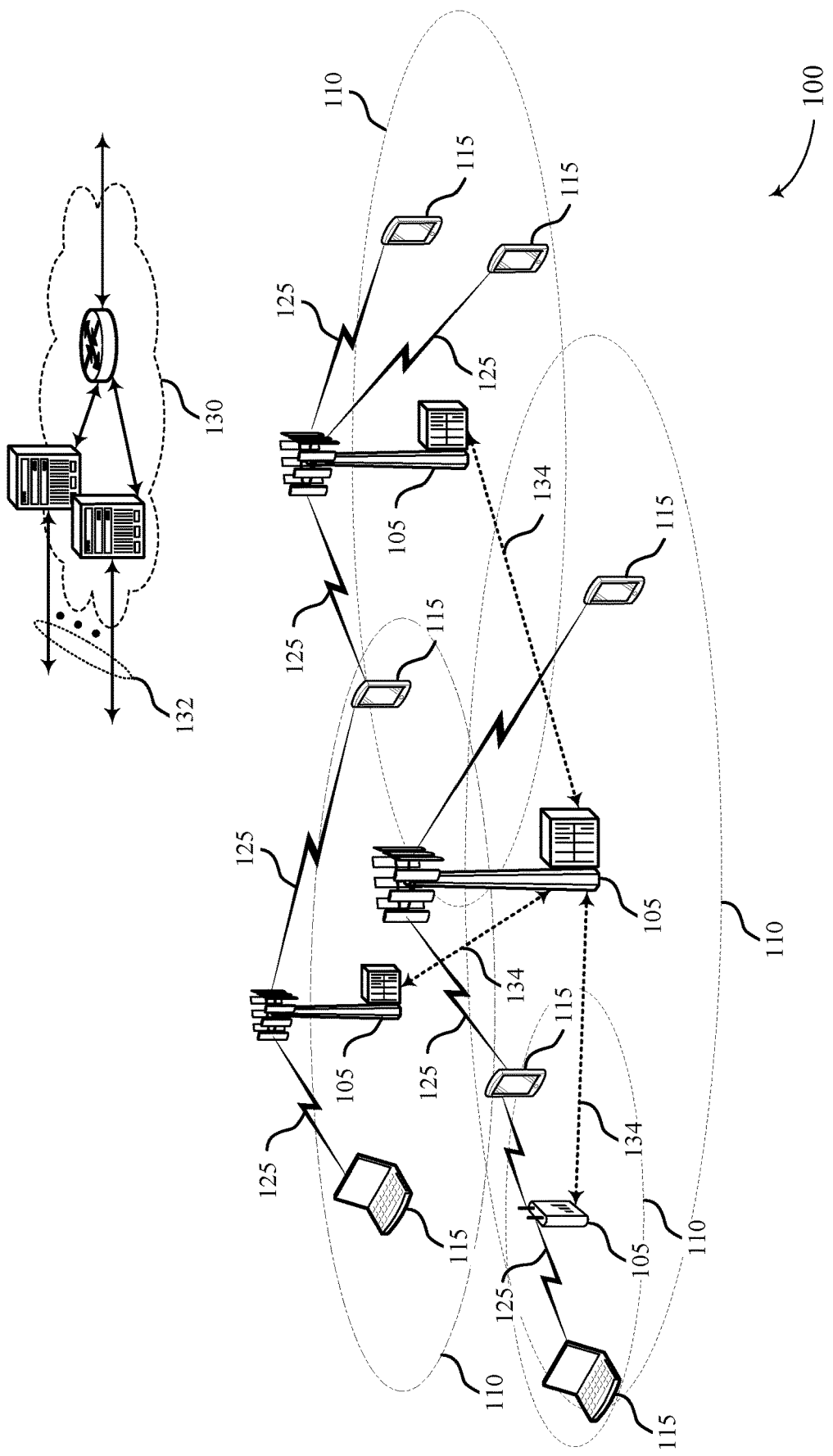
FIG. 1 illustrates an example of a system for wireless communications that supports capability-based determination of a shared data channel transmission configuration indicator (TCI) state in accordance with aspects of the present disclosure.

The described techniques relate to improved methods, systems, devices, or apparatuses that support a capability-based determination of a shared data channel transmission configuration indicator (TCI) state. Generally, the described techniques enable selection of a physical downlink shared channel (PDSCH) TCI state from among a set of different PDSCH TCI states based on a capability of the UE to support a number of TCI states and a number of control resource set (CORESET) TCI states.

A base station and a user equipment (UE) may be configured for beamformed wireless communications. For example, the base station may transmit in the direction of the UE using a directional transmit beam, where each transmit beam has an associated beam ID, beam direction, beam symbols, and the like. The UE may attempt to receive the downlink transmissions via receive beams configured using different beamforming parameters at receive circuitry at the UE. In some examples, each transmit beam may be associated with a synchronization signal block (SSB), and the UE may indicate a preferred transmit beam by transmitting uplink transmissions in resources of the SSB that is associated with the selected transmit beam. A particular SSB may have an associated transmission configuration indicator (TCI) state. The base station may, in some examples, indicate a downlink transmission beam based on antenna port quasi co-location (QCL) information that may be indicated by a TCI state. The TCI state may be associated with spatial parameters, and may correspond to analog receive beamforming parameters of a receive beam used by the UE. By the base station indicating the TCI state of a transmit beam, the UE may use the indicated TCI state to select an active or activated TCI state for a receive beam from a set of TCI states.

The base station may maintain a set of TCI states for downlink shared channel transmissions and a set of TCI states for downlink control channel transmissions on a control resource set (CORESET). The set of TCI states for downlink shared channel transmissions may correspond to beams the base station may use for downlink transmission on a CORESET and a PDSCH. The UE may also maintain a set of TCI states for receiving the PDSCH transmissions and CORESET transmissions. For example, the set of TCI states maintained by the UE may be based on a set of beam pair links (BPLs) established by the UE and the base station.

In some examples, the UE may have a defined capability to support a number of activated PDSCH TCI states and a number of activated CORESET TCI states. In some cases, the UE may operate in a limited, reduced, or minimum capability state. For example, the UE may support two activated CORESET TCI states and one activated PDSCH TCI state. In some examples, a TCI state being activated may correspond to the TCI state being available for immediate (or within a defined period of time) selection for transmission and reception. In such examples, the UE may track a corresponding tracking reference signal (TRS) for maintaining time and frequency synchronization with the base station.

The UE may signal support for defined (e.g., minimum, reduced) capabilities to the base station. For example, the UE may support one activated TCI state for receiving CORESET transmissions and one activated TCI state for receiving downlink shared channel transmissions per bandwidth part (BWP) per component carrier. In some examples, a UE with reduced capability may support a single activated TCI state for both a downlink shared channel and a CORESET per BWP per component carrier. Based on signaling the support of reduced capability, the UE may also indicate that it supports an additional activated TCI state for a CORESET in the same BWP and same component carrier. In some cases, the capability may indicate that the UE supports a first TCI state for communication of PDSCH transmission over a CORESET and PDSCH transmission, and a second TCI state for communication of PDSCH transmission over the CORESET (e.g., a second TCI state that may only be used for a physical downlink control channel (PDCCH) transmission over CORESET). Thus, as a defined capability UE, the UE may support fewer activated TCI states for PDSCH than for the CORESET.

At some time, the UE may transition from an idle mode to a connected mode (e.g., to transmit uplink data and/or to receive downlink data). The UE may enter a connected mode and may perform a random access procedure (e.g., a random access channel (RACH) procedure). In an example, the base station may transmit using a set of downlink (DL) beams that respectively correspond to a different TCI state. The UE may determine, in the RACH procedure, one or more of the DL beams the UE is capable of receiving. The UE may, for example, perform measurements and identify one or more DL beams that satisfy a signal quality threshold. The capability of the UE may indicate the one or more DL beams (e.g., identified by the RACH procedure) in addition to the supported number of active TCI states determined in connected mode (e.g., the number of active PDSCH TCI states and/or active CORESET TCI states the UE determines it is capable of supporting in connected mode).

In conventional techniques, a UE determines which TCI state to use for PDSCH based on signaling from the base station or based on the activated TCI state of a CORESET. Conventional rules may specify that the activated PDSCH TCI state follows the activated TCI state of the CORESET.

In some instances, there may be a conflict between conventional techniques for determining which PDSCH TCI state the UE is to use. For example, a base station may transmit a CORESET on multiple different control transmission beams, where each CORESET has a different activated TCI state. Multiple CORESETs may be used, for example, to increase transmission diversity of control information. By some conventional techniques, the UE may determine to use a PDCCH TCI state which follows the TCI state of the CORESET that schedules a PDSCH transmission. However, because the UE may be scheduled by multiple CORESETs on two different beams with different TCI states, the UE may not know which of the two different CORESET TCI states the UE is to use as the PDSCH TCI state to receive PDSCH transmissions.

Thus, a UE described herein may implement techniques to determine which TCI state to use when using fewer activated PDSCH TCI states than activated CORESET TCI states. The described techniques may resolve conflicting determinations based on the number of activated PDSCH TCI states and a greater number of activated CORESET TCI states. In an example, the UE may use an activated PDSCH TCI state selected by a media access control (MAC) control element (CE) received from the base station. In another example, the UE may use a TCI state of a specific CORESET as the activated PDSCH TCI state. In some examples, the UE may use a TCI state indicated in scheduling DCI as the activated PDSCH TCI state. Or, in another example, the UE may use an activated PDSCH TCI state selected by an RRC message received from the base station.

Aspects of the disclosure are initially described in the context of a wireless communications system. Aspects of the disclosure are further illustrated by and described with reference to apparatus diagrams, system diagrams, and flowcharts that relate to capability-based determination of a shared data channel TCI state (e.g., PDSCH TCI state).

FIG. 1 illustrates an example of a wireless communications system 100 that supports capability-based determination of a shared data channel TCI state in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC)

protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may contain one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA)

or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may contain one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 and a UE 115 may be configured for beamformed wireless communications. The base station 105 may transmit in the direction of the UE 115 using a directional transmit beam, and the UE 115 may monitor for the downlink transmissions using directional receive beams configured using different beamforming parameters at receive circuitry at the UE 115. Each transmit and receive beam may have an associated TCI state. The base station 105 may indicate a downlink transmission beam based on antenna ports and QCL information that may be indicated by a TCI state. A TCI state may be associated with spatial parameters and may correspond to analog receive beamforming parameters of a receive beam at the UE 115. By the base station 105 indicating a TCI state of a transmit beam, the UE 115 may select a corresponding TCI state for a receive beam.

In some examples, the UE 115 may have limited or reduced capabilities. As a reduced capability UE 115, the UE 115 may support fewer activated TCI states for PDSCH than for the CORESET. In some examples, the UE 115 may indicate that it may only support a reduced capability set (e.g., to conserve power), or the UE 115 may have fewer capabilities than other UEs. For example, the UE 115 may be an example of a reduced (e.g., minimum) capability UE 115, where the UE 115 can support two activated CORESET TCI states and one activated PDSCH TCI state. The reduced limited UE 115 and the base station 105 may implement techniques to determine which TCI state to use when the UE 115 supports fewer activated PDSCH TCI states than activated CORESET TCI states. In an example, the UE 115 may use a TCI state selected by a MAC CE as the activated PDSCH TCI state. In another example, the UE 115 may use the TCI state of a specific CORESET as the activated PDSCH TCI state. In some examples, the UE 115 may use a TCI state indicated in scheduling DCI as the activated PDSCH TCI state. Or, in another example, the UE 115 may use a TCI state selected by an RRC message as the activated PDSCH TCI state.

Figure 2:
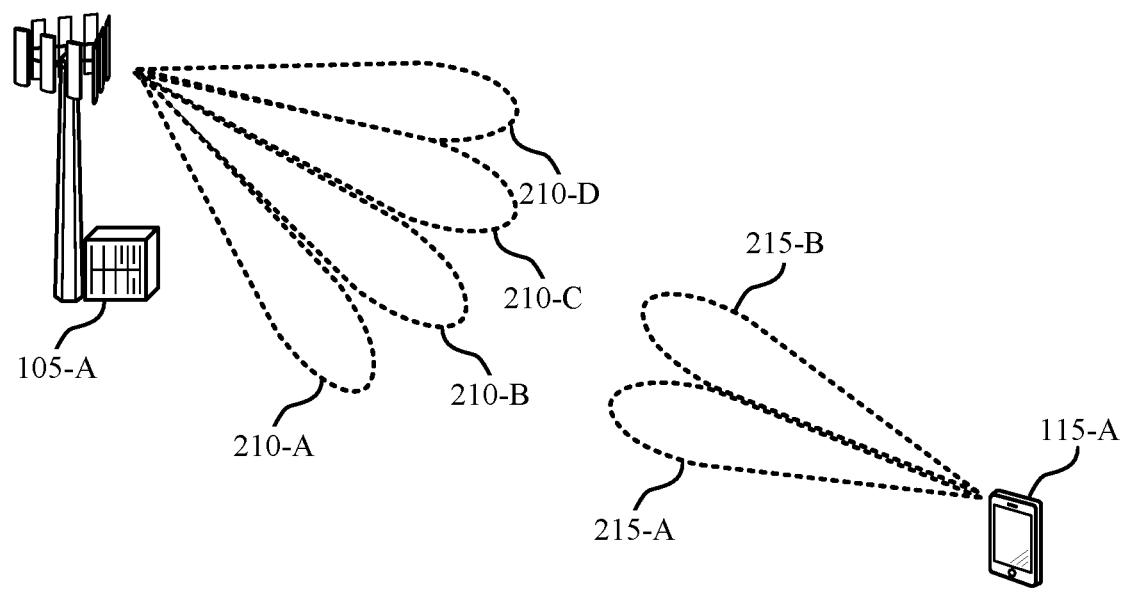
FIG. 2 illustrates an example of a wireless communications system that supports aspects of the invention in accordance with aspects of the present disclosure.

FIG. 2 illustrates an example of a wireless communications system 200 that supports capability-based determination of a shared data channel TCI state in accordance with aspects of the present disclosure. In some examples, the wireless communications 200 may implement aspects of wireless communications system 100. The wireless communications system 200 may include UE 115-*a* and base station 105-*a*, which may be respective examples of a UE 115 and a base station 105 as described herein.

Base station 105-*a* may transmit to UEs 115 located within the coverage area of base station 105-*a*, including UE 115-*a*. Base station 105-*a* and UE 115-*a* may be configured for beamformed communications, where base station 105-*a* may transmit in the direction of UE 115-*a* using a directional transmit beam (e.g., a transmit beam 210), and UE 115-*a* may receive the transmission using a directional receive beam (e.g., a receive beam 205). Each transmit beam 210 may have an associated beam ID, beam direction, beam symbols, and the like.

UE 115-*a* may attempt to receive the downlink transmissions via receive beams 215, which may be configured using different beamforming parameters at receive circuitry at UE 115-*a*. UE 115-*a* may identify a particular transmit beam 210, such as transmit beam 210-*c*, and a particular receive beam 215, such as 215-*b*, that provide relatively favorable performance (e.g., that have a best channel quality of the different measured combinations of transmit beams 210 and receive beams 215). In some examples, the UE 115-*a* may transmit an indication of which transmit beam 210 is identified at the UE 115-*a* as a preferred beam, which the base station 105-*a* may select for further transmissions to the UE 115-*a*. UE 115-*a* may thus attain and maintain a beam pair link (BPL) with base station 105-*a*, which may be further refined and maintained in accordance with one or more established beam refinement procedures. Further, in some cases, UE 115-*a* may identify one or more BPLs with one or more other base stations that may be used in the event that the BPL with base station 105-*a* fails (e.g., due to fast fading, blocking, or interference, etc.).

In some examples, each transmit beam 210 may be associated with a synchronization signal block (SSB), and UE 115-*a* may indicate the preferred transmit beam 210 by transmitting uplink transmissions in resources of the SSB that are associated with the selected transmit beam 210. A particular SSB may have an associated TCI state. Base station 105-*a* may, in some examples, indicate a downlink transmission beam based on antenna ports quasi co-location (QCL) information that may be indicated by a TCI state. A TCI state may be associated with one downlink reference signal (RS) set (e.g., a SSB and aperiodic, periodic, or semi-persistent CSI-RS) for different QCL types (e.g., QCL types for different combinations of Doppler shift, Doppler spread, average delay, delay spread, or spatial receive parameters). In cases where the QCL type indicates spatial receive parameters, it may correspond to analog receive beamforming parameters of a receive beam at UE 115-*a*. Thus, by base station 105-*a* indicating a transmit beam 210 via a TCI indication, the UE 115-*a* may select a corresponding receive beam 215 from its BPLs.

Base station 105-*a* may maintain a set of activated TCI states for downlink shared channel transmissions and a set of activated TCI states for downlink control channel transmissions. The set of activated TCI states for downlink shared channel transmissions may correspond to beams that base station 105-*a* uses for downlink transmission on a physical downlink shared channel (PDSCH). The set of activated TCI states for downlink control channel communications may correspond to beams that base station 105-*a* may use for downlink transmission (e.g., on a physical downlink control channel (PDCCH)) in a control resource set (CORESET). UE 115-*a* may also maintain a set of activated TCI states for receiving the downlink shared channel transmissions and CORESET transmissions. If a TCI state is activated at UE 115-*a*, UE 115-*a* may have antenna configurations based on the TCI state, and UE 115-*a* may not have to reconfigure antennae or antenna weighting configurations. In some examples, the set of activated TCI states (e.g., activated PDSCH TCI states and activated CORESET TCI states) at the UE 115-*a* may be configured by an RRC message.

In some examples, UE 115-*a* may have a limited or reduced set of capabilities. For example, UE 115-*a* may be an example of a minimum capability UE 115, or UE 115-*a* may operate in a mode to reduce capabilities. As a reduced capability UE 115, UE 115-*a* may support fewer activated PDSCH TCI states than activated CORESET TCI states. For example, UE 115-*a* may support two activated CORESET TCI states and one activated PDSCH TCI state. In other examples, UE 115-*a* may support more than one activated TCI state for downlink shared channel transmissions or a CORESET per BWP per component carrier (e.g., 2 or more) and may be considered a reduced-capability UE 115, as long as the number of activated PDSCH TCI states is less than the number of activated CORESET TCI states. In some examples, the number of activated TCI states supported by a UE 115 with minimum or reduced capabilities may be based on the UE 115 signaling its capabilities to the serving base station 105.

In an example, UE 115-*a* may signal support for minimum capabilities. In some examples, a UE 115 with minimum capability may support 1 activated TCI state for both a downlink shared channel and a CORESET in a BWP of a component carrier. However, based on signaling the support of minimum capability, UE 115-*a* may be able to support an additional activated TCI state for a CORESET in the same BWP and same component carrier. The additional, activated TCI state may be immediately, or within a defined time period, selected for transmission and reception, and UE 115-*a* may track a corresponding tracking reference signal (TRS) for time and frequency synchronization. However, the one activated downlink shared channel TCI state of UE 115-*a* may conflict with an existing rule used for determining a downlink shared channel TCI state in the presence of two activated CORESET TCI states.

In other wireless systems, a UE 115 may implement four different cases or rules to determine which downlink shared channel TCI state to use. In case 1, a downlink shared channel (e.g., PDSCH) may be scheduled by downlink control information (DCI) with DCI format 1_0.

In case 1, the UE 115 may use the downlink shared channel TCI state that follows that of the scheduling CORESET. In case 2, a downlink shared channel may be scheduled by DCI format 1_1, and the scheduling CORESET may have a parameter set as disabled which indicates a TCI state indicator is present in the DCI (e.g., "tci_PresentInDCI" is disabled). In case 2, the UE 115 may use a downlink shared channel TCI state that follows that of the scheduling CORESET. In case 3, the downlink shared channel may be scheduled by DCI with DCI format 1_1, and a time offset between the scheduling DCI and a scheduled PDSCH may be less than a PDSCH beam switch latency threshold signaled by the UE 115. In case 3, the UE 115 may use a downlink shared channel TCI state that follows that of a CORESET with the lowest identifier (ID) in the activated BWP and in the latest slot with a monitored search space configured. In case 4, a downlink shared channel may be scheduled by DCI with DCI format 1_1, a time offset may be greater than or equal to the PDSCH beam switch latency threshold of the UE, and the scheduling CORESET may have a parameter set as enabled which indicates that a TCI state indicator is present in the scheduling DCI (e.g., "tci_PresentInDCI" is set as enabled.) In case 4, the UE 115 may use a downlink shared channel TCI state which follows the TCI state indicated in the scheduling DCI.

However, if a UE 115 (e.g., UE 115-*a*) supports fewer activated PDSCH TCI states than activated CORESET TCI states, there may be a conflict between what the cases 1-4 determine for PDSCH TCI states and the number of used PDSCH TCI states. For example, a first and second CORESET may have different TCI states and may both be applicable for the case 1 discussed above. Thus, according to the cases 1-4 described above, the UE 115 may determine to use a PDSCH TCI state following that of the scheduling CORESET. However, because the UE 115 is scheduled by a CORESET transmitted on two different beams with different TCI states, the UE 115 may not know which of the two TCI states to use as the activated PDSCH TCI state.

As indicated above, various aspects of the present disclosure provide that a base station 105 and a UE 115, such as base station 105-*a* and UE 115-*a*, may implement techniques to coordinate rules for using or updating TCI states at UE 115-*a*. For example, if UE 115-*a* has minimum or reduced capability, base station 105-*a* and UE 115-*a* may implement techniques to resolve conflicts between the number of supported activated PDSCH TCI states and the differing number of TCI states determined based on the existing rules in cases 1-4 provided herein. In some aspects, the UE 115-*a* may implement one or more of these techniques (e.g., using a TCI state indicator in a MAC CE if the MAC CE is received by the UE 115-*a* or using a TCI state of a specific CORESET if the MAC CE is not received by the UE 115-*a* as described in greater detail below, for example, with reference to block 1410 of FIG. 14, and/or the like) only if the first and second CORESETs have different TCI states (e.g., if the UE 115-*a* is configured with two different active TCI states). If the UE 115-*a* is configured with a single TCI state (e.g., if the UE 115-*a* is configured with a single CORESET having a single active TCI state), then the existing rules in cases 1 through 4 described above may be used to select a PDSCH TCI state.

Figure 3:
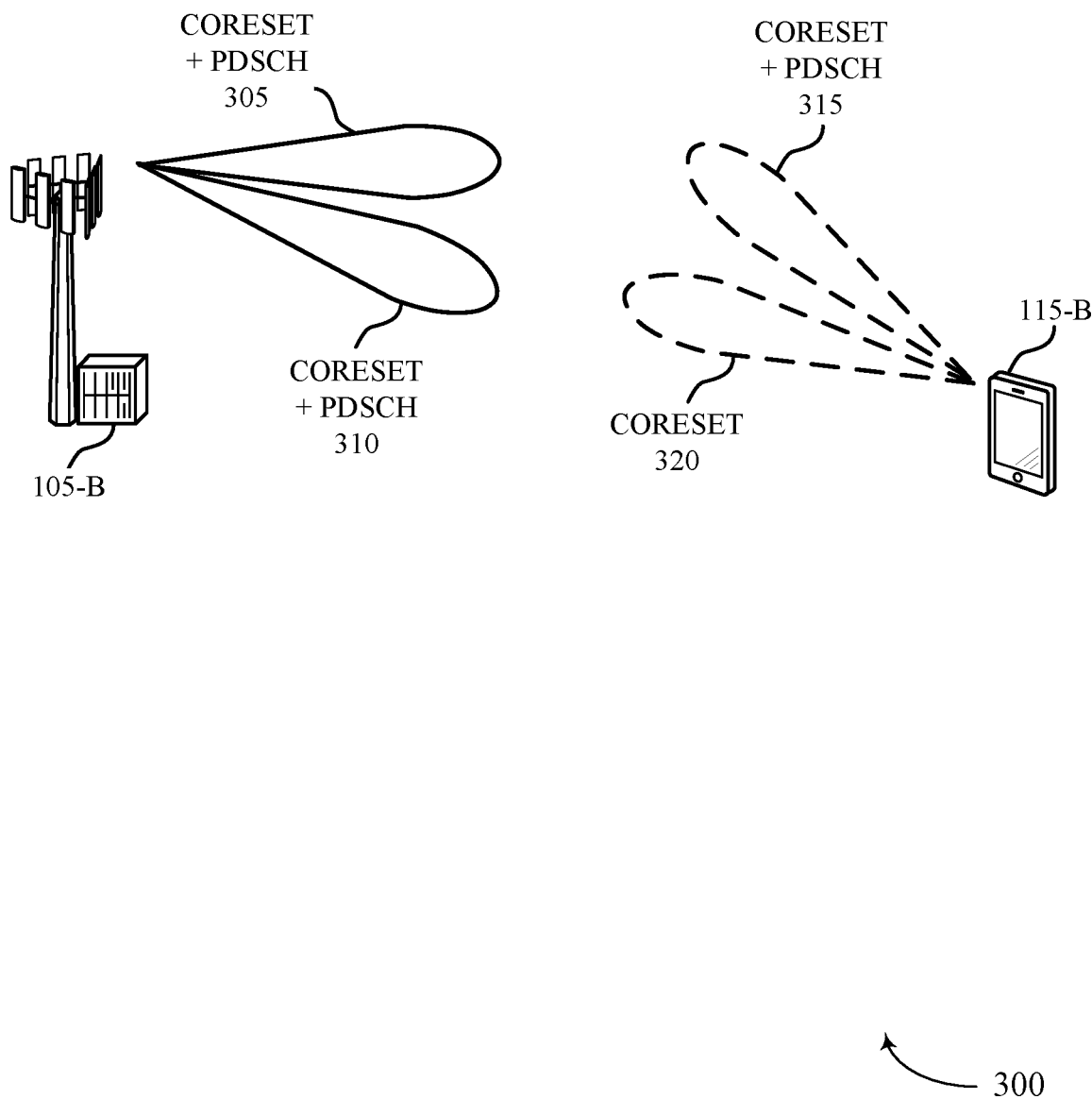
FIG. 3 illustrates an example of a wireless communications system that supports aspects of the invention in accordance with aspects of the present disclosure.

FIG. 3 illustrates an example of a wireless communications system 300 that supports capability-based determination of a shared data channel TCI state in accordance with aspects of the present disclosure. In some examples, wireless communications system 300 may implement aspects of wireless communications system 100. The wireless communications system 300 includes UE 115-*b* and base station 105-*b*, which may be examples of a UE 115 and a base station 105 as described herein.

UE 115-*b* may be a reduced capability or minimum capability UE 115 as described in FIG. 2. UE 115-*b* may, for example, support one activated TCI state for each of a downlink shared channel and a CORESET per BWP per component carrier. UE 115-*b* may indicate to base station 105-*b* support for minimum or reduced capability, and UE 115-*b* may support an additional activated TCI state for the CORESET in the same BWP and component carrier based on the indication. Thus, in some examples, UE 115-*b* may support two activated CORESET TCI states and one activated downlink shared channel TCI state (e.g., one activated PDSCH TCI state). UE 115-*b* and base station 105-*b* may implement techniques to avoid conflicting determinations for the one activated PDSCH TCI state. In some aspects, the UE 115-*b* and the base station 105-*b* may implement these techniques (e.g., using a TCI state indicator in a MAC CE if the MAC CE is received by the UE 115-*b* or using a TCI state of a specific CORESET if the MAC CE is not received by the UE 115-*b* as described in greater detail below, for example, with reference to block 1610 of FIG. 16, and/or the like) to select a PDSCH TCI state only if the UE 115-*b* is configured with two different active CORESET TCI states. If the UE 115-*b* is configured with a single active CORESET TCI state, then the existing rules in cases 1 through 4 described above in connection with FIG. 2 may be used to select a PDSCH TCI state.

For example, base station 105-*b* may use both transmit beam 305 and transmit beam 310 to transmit a CORESET to UE 115-*b*, the transmit beam 305 and the transmit beam 310 having different beam directions and TCI states. Using both transmit beams may enhance transmit diversity for the CORESET. In some examples, base station 105-*b* may transmit DCI which schedules a downlink shared channel transmission (e.g., PDSCH transmission). Base station 105-*b* may transmit data or control information on a downlink shared channel scheduled by the DCI to UE 115-*b* using one of the transmit beams 305 or 310. In some examples, base station 105-*b* may transmit the data or control information on both transmit beams 305 and 310. UE 115-*b*, being a minimum or reduced capability UE, may support, for example, two activated CORESET TCI states and one activated downlink shared channel TCI state (e.g., PDSCH state). UE 115-*b* may use the receive beam 315 or the receive beam 320 to receive the CORESETs. UE 115-*b* may then determine a TCI state to use for a receive beam to receive the downlink shared channel (e.g., PDSCH) transmission. UE 115-*b* may determine conflicting TCI states if the TCI state is determined based on cases 1-4 described in FIG. 2. Thus, UE 115-*b* may use any one or more of the following implementations to determine a TCI state for a receive beam used to receive the downlink shared channel transmission. For example, UE 115-*b* may determine to receive the downlink shared channel transmission using the receive beam 315 or the receive beam 320 based on the determined TCI state.

In a first implementation, UE 115-*b* may use a TCI state selected by, for example, a MAC CE as the activated PDSCH TCI state or other base station message. A MAC CE that indicates an active PDSCH TCI state may be referred to as a MAC CE for PDSCH TCI activation. Base station 105-*b* may include a PDSCH TCI state indicator in a MAC CE and transmit the MAC CE to UE 115-*b*. In a first example of the first implementation, the first implementation may take precedence over other factors. For example, UE 115-*b* may use the downlink shared channel TCI state included in the MAC CE regardless of a scheduling DCI format, time offset, TCI state presence parameter setting (e.g., "tci_PresentIn-DCI" value), or a TCI indicated in DCI. In the first example, the downlink shared channel TCI state selected by the MAC CE may overwrite a TCI state determined by cases 1 through 4 as described in FIG. 2. In some examples of the first implementation, base station 105-*b* may disable or refrain from transmitting an explicit indication of a TCI state in DCI when scheduling a UE 115 with minimum or reduced capability such as UE 115-*b*, or base station 105-*b* may determine or ensure that the TCI state indicated in the scheduling DCI is identical to the TCI state selected by the MAC CE.

In some cases of the first implementation, base station 105-*b* may ensure that the selected PDSCH TCI state is one of the two active control resource set TCIs. For example, base station 105-*b* may ensure the PDSCH TCI state indicated in the MAC CE corresponds to (e.g., is QCL associated with) one of the active control resource set TCI states. For example, base station 105-*b* may transmit a configuration message that indicates a set of active control resource sets, then transmit a MAC CE indicating that the PDSCH TCI state is a configured TCI state of one of the active control resource sets. In some cases, the selected TCI state may overwrite a TCI state determined by an existing rule if there is a conflict. For example, if a previous rule indicates to use a TCI state different from what is indicated in a MAC CE, UE 115-*b* may select the TCI state indicated by the MAC CE instead.

In a second example of the first implementation, the TCI state selected by the MAC CE may be used based on one or more selection conditions. In the second example, UE 115-*b* may use the TCI state selected by the MAC CE if UE 115-*b* for any combination of cases 1-3 as described in FIG. 2. However, if UE 115-*b* uses case 4 (e.g., explicit indication of TCI state in DCI and the PDSCH beam switch latency offset is greater than or equal to the timing offset between the scheduling DCI and the scheduled PDSCH), UE 115-*b* may use the third implementation (discussed below) to determine the activated PDSCH TCI state.

In a third example of the first implementation, UE 115-*b* may use a TCI state selected by a MAC CE (as described above) as the activated PDSCH TCI state if the MAC CE is received by UE 115-*b*. However, if the MAC CE is not received by UE 115-*b*, then UE 115-*b* may use a TCI state of a specific CORESET as the activated PDSCH TCI state, as described in the second implementation below.

In a second implementation, UE 115-*b* may use the TCI state of a specific CORESET as the activated PDSCH TCI state for a receive beam. The specific CORESET may be a CORESET with a fixed, lowest, or highest ID in a current component carrier or current active BWP, or a CORESET in the current active BWP and in the latest TTI (e.g., slot) with a monitored search space configured. The UE 115-*b* may determine the specific CORESET by comparing CORESET IDs of all CORESETs configured for the UE 115-*b*, by comparing CORESET IDs for CORESETs in the latest TTI (e.g., slot) for which a monitored search space is configured, by comparing CORESET IDs for CORESETs in the current active BWP, and/or the like. For example, the UE 115-*b* may determine a specific CORESET with a fixed, lowest, or highest ID among all CORESETs configured for the UE or among all CORESETs in the latest TTI monitored by the UE 115-*b*. The current active BWP may be the BWP in which the base station 105-*b* and the UE 115-*b* are communicating via the scheduling CORESET and the associated PDSCH scheduled by the CORESET. In some cases, the active downlink shared channel TCI state (e.g., the active PDSCH TCI state) may follow one of the active CORESET TCI states, such as the CORESET with a lowest, or highest, control resource set ID and a configured TCI state of that CORESET in the current BWP. For example, UE 115-*b* may receive a configuration message that indicates a set of active control resource sets, then UE 115-*b* may select the PDSCH TCI state based on a configured TCI state of a first active control resource set which has a highest or lowest identifier of a set of identifiers corresponding to the indicated set of active control resource sets. The base station 105-*b* may configure the UE 115-*a* to monitor a search space for within a particular TTI or a TTI having a defined periodicity for the CORESET. In some examples, the fixed ID or whether to use the fixed, lowest, or highest ID may be signaled to UE 115-*b* using one or more of an RRC message, a MAC CE, or DCI. In some examples, at least one criterion for selecting a specific CORESET may be statically configured or otherwise defined. In some cases, UE 115-*b* may use a downlink shared channel TCI state corresponding to the control resource set with the lowest (or highest) TCI state ID. For example, UE 115-*b* may receive a configuration message that indicates a set of active control resource sets, where each of the set of active control resource sets have a respective configured TCI state of a set of TCI states. UE 115-*b* may then select the PDSCH TCI state based on a first configured TCI state of the set of TCI states, the first configured TCI state having a lowest or highest TCI state identifier of a set of TCI state identifiers that respectively correspond to the set of TCI states. For example, each configured control resource set may have a corresponding TCI state, where each of the corresponding TCI states has a TCI state identifier. UE 115-*b* uses a PDSCH TCI state that corresponds to the TCI state of the configured control resource sets which has a lowest or highest identifier.

Each configured control resource set may have a configured TCI state. Each configured control resource set may also have a control resource set identifier. Each configured TCI state may have a TCI state identifier. In some cases, the PDSCH TCI state may be selected based on a highest or lowest control resource set identifier of the configured control resource sets. For example, UE 115-*b* may select a PDSCH TCI state corresponding to a TCI state of the control resource set with the highest or lowest control resource set identifier. Additionally, or alternatively, the PDSCH TCI state may be selected based on a highest or lowest TCI state identifier of the TCI states corresponding to the configured control resource sets.

In a first example of the second implementation, the second implementation may take precedence over other factors. For example, the TCI state used by the specific CORESET may overwrite a TCI state determined by cases 1-4 described in FIG. 2, or the TCI state used by the specific CORESET may overwrite a TCI state indicated in a MAC CE (e.g., described in the first implementation). In some examples, to avoid conflicting explicit TCI state indicators, base station 105-*b* may not signal a TCI state in the scheduling DCI or may select an activated TCI state via MAC CE for a UE 115 with reduced or minimum capability (e.g., UE 115-*b*). Or, base station 105-*b* may ensure that the TCI state indicated in the scheduling DCI or selected by a MAC CE is identical to the one used by the specific CORESET.

In a second example of the second implementation, UE 115-*b* may use the second implementation to determine an activated TCI state for the downlink shared channel under one or more selection conditions. For example, a selection condition may be that UE 115-*b* may use the TCI state of a specific CORESET for cases 1-3 described in FIG. 2, where the selection condition may be that the UE 115-*b* is to select the TCI state of the CORESET having a lowest or highest identifier value of a number of CORESET identifier values for the configured CORESETs. With case 4, UE 115-*b* may identify which format of multiple different formats is used for a scheduling DCI, and the selection condition may be that the UE 115-*b* is to use the TCI state of the DCI if the scheduling DCI is in a particular format (e.g., the third implementation described below).

In a third implementation, UE 115-*b* may use a TCI state indicated in the scheduling DCI as the used downlink shared channel TCI state. In some examples, UE 115-*b* may use the TCI state of the scheduling DCI if the scheduling DCI has a particular format (e.g., DCI format 1_1). In an example, base station 105-*b* may transmit scheduling DCI for a PDSCH transmission on the transmit beam 305 with a first TCI state. UE 115-*b* may receive the scheduling DCI on the receive beam 315, determine the TCI state used by the transmit beam 305, and receive the PDSCH transmission on the receive beam 315, which may use a TCI state corresponding to the transmit beam 305.

In a first example of the third implementation, the third implementation may take precedence over other factors. Base station 105-*b* may determine that case 4, described in FIG. 2, is valid for UEs 115 with minimum or reduced capability, such as UE 115-*b*. As an example, case 4 is where DCI format 1_1 is used, the time offset between the scheduling DCI and the scheduled downlink shared channel (e.g., PDSCH) transmission is greater than or equal to the beam switch latency threshold of the receiving UE 115, and the scheduling CORESET has "tci_PresentInDCI" set as enabled. A scheduling CORESET may refer to a CORESET that schedules a PDSCH transmission to a UE. In some examples, to avoid explicit conflict with a TCI state selected by a MAC CE, base station 105-*b* may refrain from MAC CE-based selection for UEs 115 with minimum or reduced capability. Or, base station 105-*b* may ensure the TCI state selected by a MAC CE is identical to the TCI state indicated in DCI.

In a second example of the third implementation, UE 115-*b* may use the TCI state indicated in the scheduling DCI under one or more selection conditions. For example, a first selection condition may be that the UE 115-*b* may use the TCI state indicated in the scheduling DCI for case 4 as described in FIG. 2. Otherwise, UE 115-*b* may use another implementation to determine the activated downlink shared channel TCI state (e.g., any combination of cases 1-3). UE 115-*b* may use, for example, the first or second implementation for any combinations of cases 1-3.

In a fourth implementation, UE 115-*b* may use an activated downlink shared channel TCI state selected by one or more RRC messages. In some cases, the active PDSCH TCI state may (e.g., always) follow a single RRC-configured PDSCH TCI state. In cases where there are multiple downlink shared channel TCI states used by base station 105-*b*, an RRC message may inform UE 115-*b* which one is the activated downlink shared channel TCI state. In some examples, the RRC message may indicate an activated PDSCH state of UE 115-*b*, or the RRC message may indicate a TCI state which is not an activated PDSCH state of UE 115-*b*. If there is a single configured downlink shared channel TCI state, the corresponding RRC configuration message itself may implicitly indicate that the configured TCI state is the activated TCI state. In a first example of the fourth implementation, the fourth implementation may take precedence over other factors. For example, the TCI state indicated by an RRC message may overwrite a TCI state determined by an existing rule for cases 1-4 or a TCI state selected by a MAC CE. In some examples, to avoid explicit conflict, base station 105-*b* may refrain from indicating a TCI state in scheduling DCI or selecting a TCI state in a MAC CE for reduced or minimum capability UEs 115. In some examples, case 4 and MAC-CE based selection may be disallowed by the base station 105 for UE with minimum or reduced capability, or the base station 105 may cause the TCI state in scheduling DCI or selected by MAC-CE to be identical to the one indicated in the RRC message.

In a second example of the fourth implementation, UE 115-*b* may use the TCI state indicated by RRC signaling under certain conditions. For example, a selection condition may be such that the UE 115-*b* may use the TCI state indicated by RRC signaling as the activated TCI state for a downlink shared channel transmission under any combination of cases 1-3 described in FIG. 2. Otherwise, UE 115-*b* may determine the activated TCI state for the downlink shared channel using another implementation, such as using implementation 3 for case 4.

Base station 105-*b* may signal to UE 115-*b* to use these implementations to determine the activated TCI state for the downlink shared channel. Base station 105-*b* may indicate any one or more of the implementations (e.g., implementations 1-4), which may be referred to as new TCI state selection rules for activated TCI state selection. The signaling may be carried by bits in DCI, by a MAC CE, or by an RRC message.

In some examples, base station 105-*b* may transmit a CORESET including scheduling DCI to UE 115-*b*, but the scheduling CORESET may have a parameter indicating the presence of TCI in the scheduling CORESET set as disabled. For example, "tci_PresentInDCI" may be set as disabled. In a first example when a TCI indication is not present in control information (e.g., DCI), UE 115-*b* may use an activated downlink shared channel TCI state selected by a MAC CE from all of the configured downlink shared channel TCI states. In a second example of when a TCI indication is not present in control information (e.g., DCI), UE 115-*b* may use the TCI state used by a particular CORESET, where selecting the particular CORESET is similar to the techniques described for the second implementation above. In a third example of when a TCI indication is not present in control information (e.g., DCI), UE 115-*b* may use an activated downlink shared channel TCI state indicated in an RRC message (e.g., similar to the fourth implementation described above).

As described, UE 115-*b* may be an example of a minimum capability UE 115 or a reduced capability UE 115. If UE 115-*b* is a reduced capability UE 115, UE 115-*b* may, for example, use one activated TCI state for receiving downlink shared channel transmissions and one activated TCI state for receiving downlink CORESET transmissions in a BWP of a component carrier. If UE 115-*b*, as a reduced capability UE, indicates support for reduced capability to base station 105-*b*, UE 115-*b* may support an additional activated TCI state for the same BWP and the same component carrier, thus supporting two activated TCI states for a CORESET and one activated TCI state for a downlink shared channel in a BWP of a component carrier.

In some other examples, UE 115-*b* may be a reduced capability UE 115 that supports fewer activated TCI states for downlink shared channels than for CORESETs. The used PDSCH TCI state may be limited within the set of activated PDSCH TCI states, so that UE 115-*b* may not have flexibility to follow the used TCI state of a scheduling CORESET if the used CORESET TCI is outside of the set of activated PDSCH TCI states. UE 115-*b* may indicate, to the base station 105, support of limited capability as well as a number of TCI states supported for PDSCH and CORESETs. In some cases, the capability includes the downlink beam determined by random access procedure in addition to the supported number of TCI states determined in the connected mode (e.g., the number of active control resource set TCI states supported in connected mode). For example, the capability includes a downlink beam determined by a random access procedure and a supported number of active TCI states in a connected mode. The minimum capability on downlink beams may include the downlink beam identified by a RACH procedure in addition to the supported number of active TCI states determined in connected mode.

If UE 115-*b* is a reduced capability UE 115, UE 115-*b* and base station 105-*b* may implement additional techniques for the implementations described above. For example, as an extension to the second implementation, UE 115-*b*, as a capability limited UE 115, may use the used TCI state of one of X selected reference CORESETs as the activated PDSCH TCI state, where the used TCI states of the selected reference CORESETs corresponding to the X activated PDSCH TCI state numbers. The UE 115 may not, in some examples, use an activated CORESET TCI state that is not included in the X selected reference CORESETs. For example, there may be N TCI states in the set of activated CORESET TCI states, where N>X In some examples, the X selected CORESETs may have fixed IDs in the current component carrier or in the current activated BWP. The fixed IDs may be signaled to UE 115-*b* via RRC message, MAC CE, DCI, or may be statically configured (e.g., via specification).

In some cases, each scheduling CORESET is associated with one of the X selected reference CORESETs, and the activated TCI state of PDSCH scheduled by a CORESET may follow the TCI state (e.g., be the same TCI state) of the selected reference CORESET associated with the scheduling CORESET. In some examples, the associated reference CORESET per scheduling CORESET may be signaled via RRC message, MAC CE, DCI, or may be statically configured (e.g., via specification).

As an extension to the third implementation, if UE 115-*b* is a capability limited UE 115, UE 115-*b* may use the TCI state indicated in scheduling DCI having a defined format (e.g., format 1_1). In some examples, the extension to the third implementation may be used for any reduced capability UE 115. Thus, base station 105-*b* transmitting scheduling information to reduced capability UEs 115 may ensure that case 4 (e.g., as described above and in FIG. 2) is valid for reduced capability UEs 115.

Figure 4:
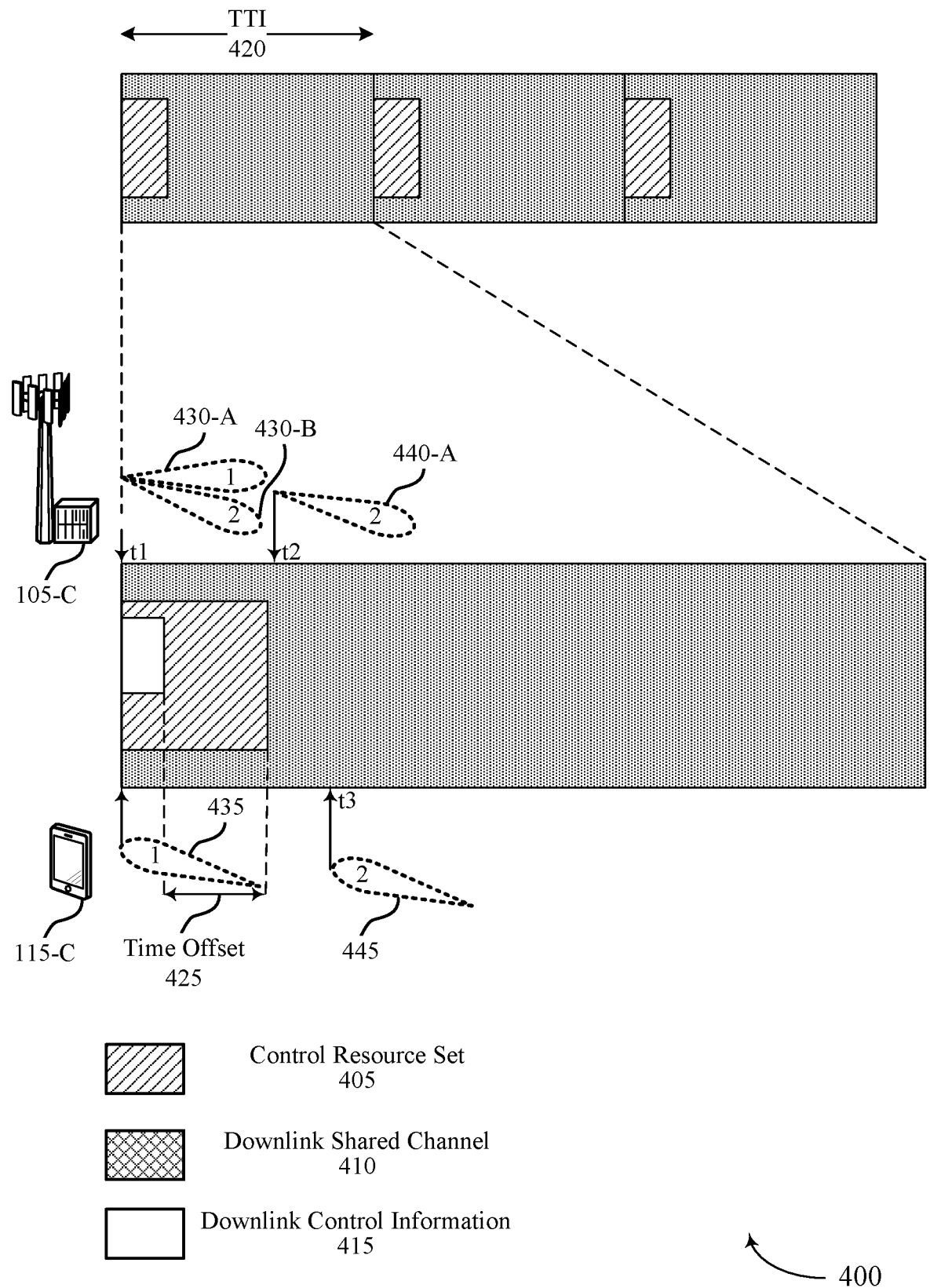
FIG. 4 illustrates an example of a TCI state technique that supports aspects of the invention in accordance with aspects of the present disclosure.

FIG. 4 illustrates an example of a TCI state technique 400 that supports capability-based determination of a shared data channel TCI state in accordance with aspects of the present disclosure. In some examples, the TCI state technique 400 may implement aspects of wireless communications system 100. The TCI state technique 400 includes base station 105-*c* and UE 115-*c*, which may be respective examples of a base station 105 and a UE 115 as described herein. In some examples, UE 115-*c* may be an example of a capability limited or reduced capability UE 115. In the follow examples, UE 115-*c* may support two activated TCI states for a CORESET and one activated TCI state for a downlink shared channel (e.g., PDSCH).

Base station 105-*c* may allocate a control resource set 405 (e.g., a CORESET) for transmitting control information to UE 115-*c*. The control resource set 405 may include resources allocated for transmitting DCI 415 to UE 115-*c*. In some examples, the DCI 415 may include scheduling information for a downlink shared channel 410 (e.g., a shared data channel) used to transmit data information to UE 115-*c*. The control resource set 405 and the downlink shared channel 410 may occupy at least a portion of a BWP of a component carrier.

Base station 105-*c* may transmit the control resource set 405 using transmit beams 430-*a* and 430-*b*, each transmit beam 430 corresponding to a different TCI state (e.g., '1' and '2,' respectively). UE 115-*c* may have two activated TCI states for receiving a CORESET (e.g., '1' and '2'). The activated TCI state (e.g., '1') used to receive the control resource set 405 may correspond to receive beam 435. Base station 105-*c* may begin transmitting the downlink control channel at time 't1,' at the beginning of a TTI 420 (e.g., slot).

UE 115-*c* may determine an activated TCI state to use for a receive beam 445 to receive the downlink shared channel transmissions. For example, UE 115-*c* may determine the TCI state based on an implementation described in FIG. 3 (e.g., the first through fourth implementation). In some examples, the implementation used may be based on a time difference between a scheduling DCI (e.g., the DCI 415) and a scheduled downlink shared channel transmission (e.g., on the downlink shared channel 410). UE 115-*c* may determine whether a time offset 425 between the DCI 415 and the scheduled downlink shared channel transmission is less than a beam switch latency threshold known and signaled by UE 115-*c*. In the illustrated example, the time offset 425 is less than the beam switch latency threshold, shown by UE 115-*c* finishing steering the beam 445 at time t3, which is after the start of the downlink shared channel transmission using the beam 440-*a* at t2. UE 115-*c* may apply adjustments to its antenna array or antenna weighting configuration to steer from the receive beam 435 to the receive beam 445 based on the TCI state used to receive the downlink shared channel transmission.

Figure 5:
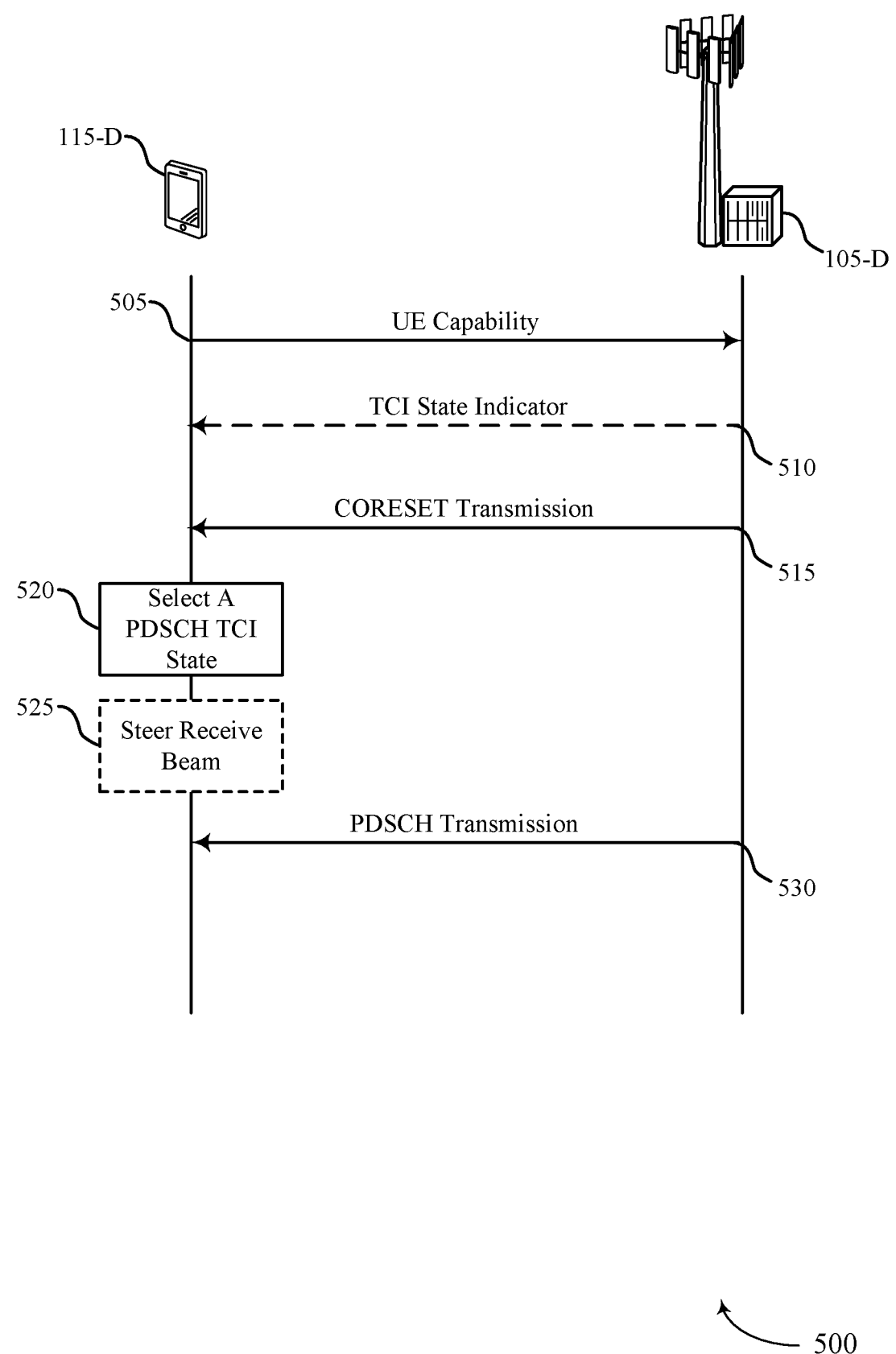
FIG. 5 illustrates an example of a process flow that supports aspects of the invention in accordance with aspects of the present disclosure.

FIG. 5 illustrates an example of a process flow 500 that supports capability-based determination of a shared data channel TCI state in accordance with aspects of the present disclosure. In some examples, process flow 500 may implement aspects of wireless communication systems 100. The process flow 500 includes UE 115-*d* and base station 105-*d*, which may be respective examples of a UE 115 and a base station 105. In some examples, UE 115-*d* may be an example of a minimum capability or reduced capability UE 115.

At 505, UE 115-*d* may identify a capability to support a number of PDSCH TCI states and a number of CORESET TCI states and may indicate the capability to base station 105-*d*. In some examples, UE 115-*d* may indicate the support of minimum capability or reduced capability. In some examples, UE 115-*d* may identify a number of PDSCH TCI states and the CORESET TCI states that the UE 115 may support (e.g., one or more), and optionally may signal a capability indicator to the base station 105 to indicate its capability to support the identified number of PDSCH TCI states and the identified number of CORESET TCI states to the base station 105. In some cases, the capability indicator may be used to index a table (e.g., a table stored at each of the UE 115-*d* and the base station 105-*d*) that includes various combinations of the identified number of PDSCH TCI states and the identified number of CORESET TCI states. In some examples, the capability indicator may be a bit or a sequence of bits.

In some examples, base station 105-*d* may transmit a TCI state indicator to UE 115-*d* at 510. In some cases, the TCI state indicator may be transmitted in a MAC CE, DCI, or an RRC message. In some cases, the base station 105-*d* may not transmit (e.g., may refrain from transmitting) a TCI state indicator. Thus, transmission of the TCI state indicator by the base station 105-*d* is optional. If the TCI state indicator is transmitted by the base station 105-*d* (e.g., in a MAC CE), then the UE 115-*d* may use the TCI state indicator to determine a PDSCH TCI state. If the TCI state indicator is not transmitted by the base station 105-*d* (e.g., in a MAC CE), then the UE 115-*d* may use a TCI state of a specific CORESET as the activated PDSCH TCI state, such as a specific CORESET with a fixed, lowest, or highest ID among all CORESETs configured for the UE 115-*d* or among all CORESETs in the latest TTI monitored by the UE 115-*d*.

In some examples, the base station 105-*d* may select a first PDSCH TCI state among a set of different PDSCH TCI states based on the capability indicated in the capability indicator. In some cases, the capability indicator may indicate, or the base station 105-*d* may determine based on the capability indicator, that the UE 115-*d* may support fewer activated PDSCH TCI states than activated CORESET TCI states. The base station 105-*d* may thus select a TCI state based on the implementations discussed in FIG. 3 for the UE 115-*d* supporting fewer activated PDSCH TCI states than activated CORESET TCI states. In some cases, UE 115-*d* may (e.g., always) select an active PDSCH TCI state as indicated by a MAC CE. In some cases, base station 105-*d* may ensure that the selected PDSCH TCI state is one of the active control resource set TCI states (e.g., one of two active control resource set TCI states). In other examples, the base station 105-*d* may select a TCI state based on the cases discussed in FIG. 2 for a UE that is not supporting fewer activated PDSCH TCI states than activated CORESET TCI states.

At 515, base station 105-*d* may transmit DCI to UE 115-*d* in a CORESET. In some examples, the DCI may schedule a PDSCH transmission. In some examples, the DCI may include an indication of a TCI state to use for the PDSCH transmission. In some cases, UE 115-*d* may select a TCI state for a receive beam to use to receive the PDSCH transmission. In some cases, the indicated TCI state may be an activated PDSCH TCI state at UE 115-*d*. In some cases, base station 105-*d* may transmit the CORESET to UE 115-*d* on multiple beams, where each beam used to transmit the CORESET is associated with a different TCI state and beam direction.

At 520, UE 115-*d* may select a PDSCH TCI state from a set of different PDSCH TCI states based on the capability of UE 115-*d*. The selected PDSCH TCI state may be based on the capability of UE 115-*d* due to one or more of, for example, a number of supported activated PDSCH TCI states at UE 115-*d*, which PDSCH TCI states are active at UE 115-*d*, a beam switch latency of UE 115-*d*, or other factors. In some examples, UE 115-*d*, due to operating with a reduced or minimum capability, may select the PDSCH TCI state based on implementations 1-4 described in FIG. 3. In some examples, UE 115-*d* may select the PDSCH TCI state based on the TCI state indicator received at 510, or UE 115-*d* may select the PDSCH TCI state based on a TCI state of the CORESET transmission at 515. In some examples, UE 115-*d* may select the PDSCH TCI state based on receiving a MAC CE indicating the PDSCH TCI state. In some examples, UE 115-*d* may select the PDSCH TCI state based on whether a selection condition is satisfied. In some examples, UE 115-*d* may receive an indicator of a TCI state of a specific CORESET of a set of CORESETs, where the TCI state of the specific CORESET is selected as the PDSCH TCI state. In some examples, the UE 115-*d* may use a TCI state indicator to select the PDSCH TCI state if the UE 115-*d* receives the TCI state indicator from the base station 105-*d* (e.g., in a MAC CE), and may use a TCI state of a specific CORESET as the activated PDSCH TCI state if the UE 115-*d* does not receive the TCI state indicator from the base station 105-*d* (e.g., in a MAC CE). In other examples, when the UE 115-*d* is not operating with a reduced or minimum capability, the UE 115-*d* may determine to select an activated PDSCH TCI state based on cases 1-4 of FIG. 2.

In some examples, at 525, UE 115-*d* may adjust a direction of a receive beam to receive the PDSCH transmission. UE 115-*d* may select different antennas or apply different weights to antennas to steer the receive beam based on the selected PDSCH TCI state. At 530, UE 115-*d* may monitor for a downlink transmission (e.g., PDSCH transmission) on a downlink data receive beam corresponding to the PDSCH TCI state and the scheduling CORESET, and, in some examples, may receive the downlink transmission via the downlink data receive beam.

Figure 6:
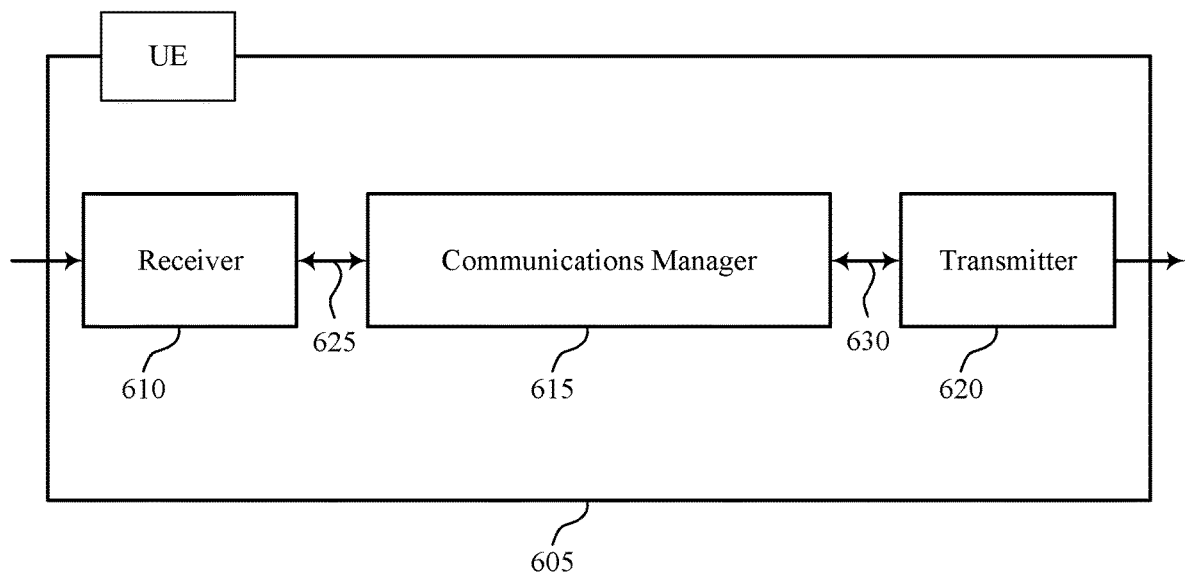
FIGS. 6 and 7 show block diagrams of devices that support aspects of the invention in accordance with aspects of the present disclosure.

FIG. 6 shows a block diagram 600 of a device 605 that supports capability-based determination of a shared data channel TCI state in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may monitor a wireless channel for a downlink transmission, and may receive information via an electrical connection, the information including packets, user data, or control information associated with various information channels (e.g., control channels, data channels, and information related to various aspects of the invention, etc.), and so on. Information 625 may be passed via an electrical connection on to other components of the device 605. The receiver 610 may transmit at least the received information 625 to the communications manager 615 via an electrical connection (e.g., a wire or a bus). The receiver 610 may be an example of aspects of the transceiver 920 described with reference to FIG. 9. The receiver 610 may utilize a single antenna or a set of antennas, which collect the information from a transmitting device (e.g., a base station 105).

The communications manager 615 may receive information 625 from the receiver 610 via an electrical connection, and based at least in part on the information 625, may identify a capability of the UE to support a number of PDSCH TCI states and a number of CORESET TCI states, select a first PDSCH TCI state among a set of different PDSCH TCI states based on the identified capability, and monitor for a downlink transmission on a downlink data receive beam corresponding to the first PDSCH TCI state. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may receive signals generated by other components of the device 605, and may transmit at least the received signals to other components of the device 605, or a base station 105. In some examples, transmitter 620 may receive a signal 630 including at least one shared data channel TCI state and/or UE capability. Transmitter 620 may then transmit a downlink transmission based at least in part on the received signal 630. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
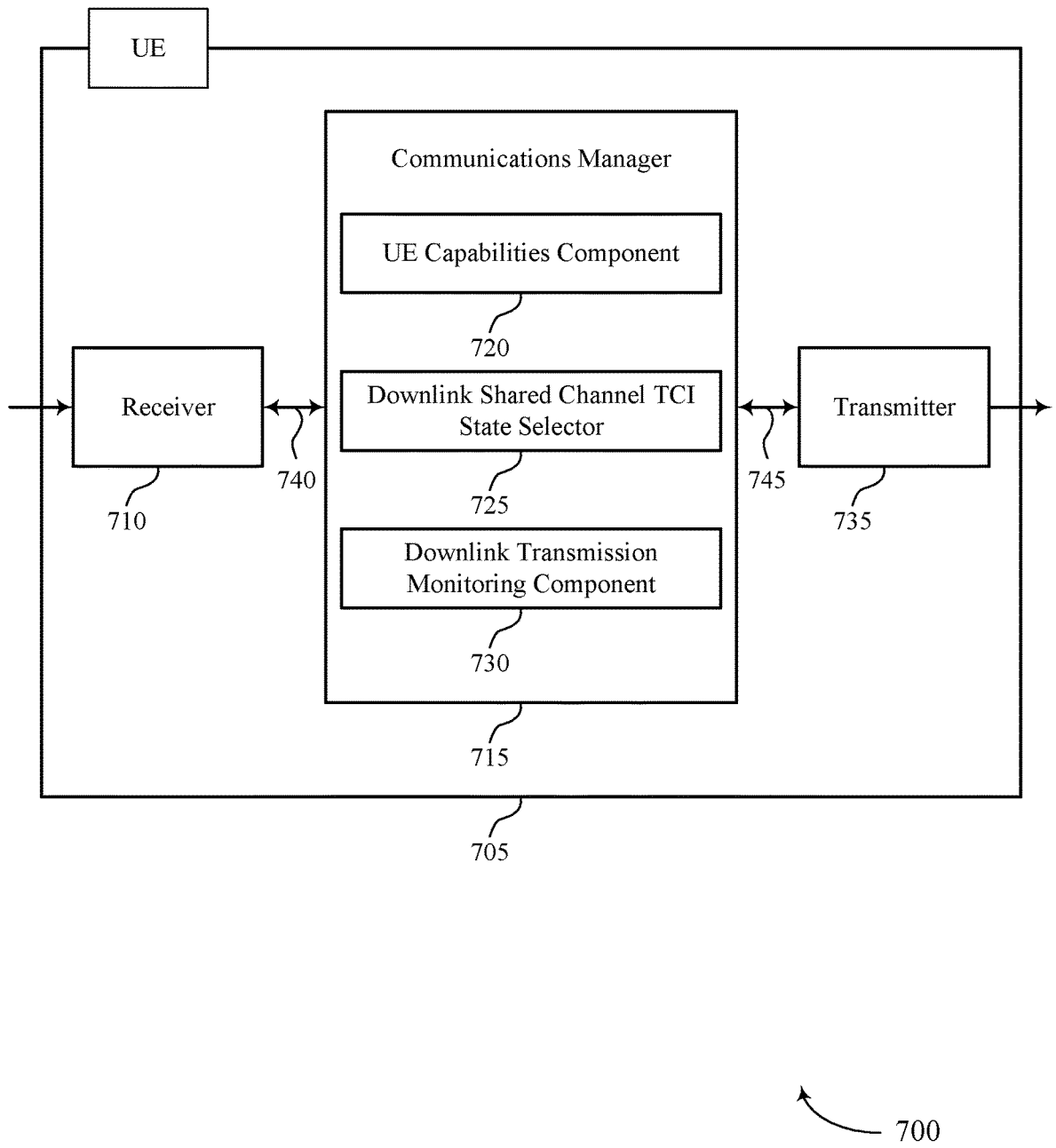

FIG. 7 shows a block diagram 700 of a device 705 that supports capability-based determination of a shared data channel TCI state in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may monitor a wireless channel for a transmission, and may receive information such as packets, user data, or control information associated with various information channels (e.g., control channels, data channels, and information related to various aspects of the invention, etc.) from a base station 105 via the wireless channel. The received information 740 may be passed on to other components of the device 705. Receiver 710 may transmit at least the received information 740 to the communications manager 715 or one or more of the components of communications manager 715 via an electrical connection (e.g., a wire or a bus). The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a UE capabilities component 720, a downlink shared channel TCI state selector 725, and a downlink transmission monitoring component 730. The communications manager 715 may be an example of aspects of the communications manager 910 described herein.

The communications manager 715 may receive the information 740 from the receiver 710 via the electrical connection, and may direct the received information 740 to one or more components of the communications manager 715. Based at least in part on the information 740, UE communications manager may identify a capability of the UE to support a number of PDSCH TCI states and a number of CORESET TCI states, select a first PDSCH TCI state among a set of different PDSCH TCI states based on the identified capability, and monitor for a downlink transmission on a downlink data receive beam corresponding to the first PDSCH TCI state.

The transmitter 735 may receive information 745 generated by other components of the device 705 via one or more electrical connections, and may transmit a signal generated based on the received information 745 to the base station 105. In some cases, transmitter 735 may receive information 745, such as one or more TCI states or UE capabilities, via an electrical connection, from one or more components of the communications manager 715. In some examples, the transmitter 735 may be collocated with a receiver 710 in a transceiver module. For example, the transmitter 735 may be an example of aspects of the transceiver. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
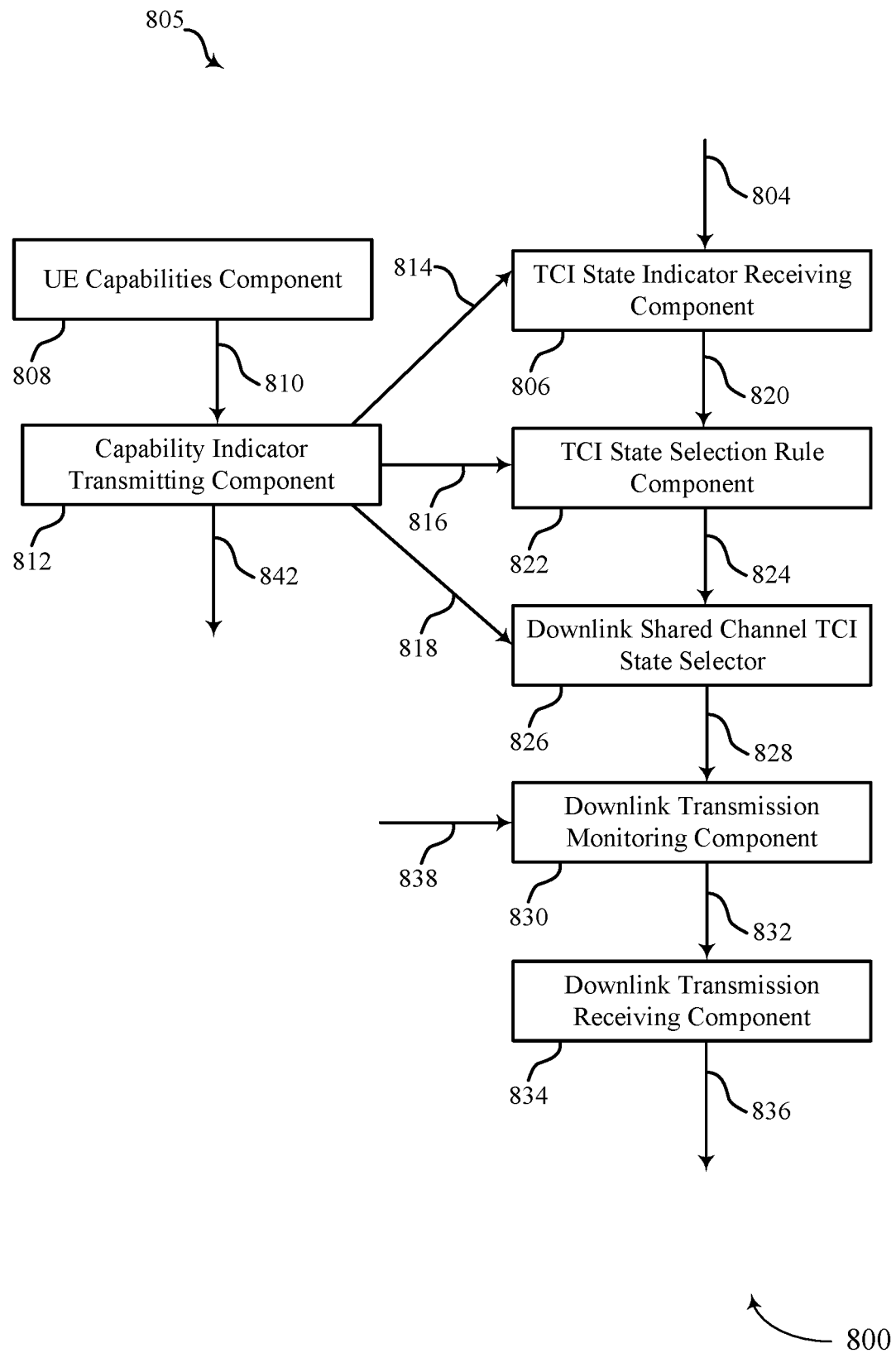
FIG. 8 shows a block diagram of a communications manager that supports aspects of the invention in accordance with aspects of the present disclosure.

FIG. 8 shows a block diagram 800 of a UE communications manager 805 that supports capability-based determination of a shared data channel TCI state in accordance with aspects of the present disclosure. The communications manager 805 may be an example of a communications manager 615, a communications manager 715, or a communications manager 910 described herein. The communications manager 805 may include a number of components, including a TCI state indicator receiving component 806, a UE capabilities component 808, a capability indicator transmitting component 812, a TCI state selection rule component 822, a downlink shared channel TCI state selector 826, a downlink transmission monitoring component 830, and a downlink transmission receiving component 834. Each of these modules may communicate, directly or indirectly, with one another (e.g., via signaling or one or more buses).

The UE communications manager 805 may receive information from a receiver (e.g., receiver 610, receiver 710, or transceiver 920, as described herein), and may direct the received information to one or more components of the UE communications manager 805 via an electrical connection or signaling. Based at least in part on the information, the UE communications manager 805 may identify a capability of the UE (e.g., via UE capabilities component 808) to support a number of PDSCH TCI states and a number of CORESET TCI states. The UE communications manager 805 may further use the received information to select a first PDSCH TCI state among a set of different PDSCH TCI states based on the identified capability using for example, TCI state selection rule component 822, downlink shared channel TCI state selector 826, or by communication with other device components. UE communications manager 805 may further monitor for a downlink transmission (e.g., via downlink transmission monitoring component 830) on a downlink data receive beam corresponding to the first PDSCH TCI state.

UE communications manager 805 may receive information via a receiver, such as receiver 610, 710, 1010, or 1110 as described herein. In some cases, the UE communications manager 805 may identify a capability of the UE to support a number of PDSCH TCI states and a number of CORESET TCI states. In some examples, the capability of the UE indicates that the UE is capable of supporting, in some cases only supporting, a first TCI state for communicating PDCCH transmissions over a CORESET, and a second TCI state for communicating PDCCH transmissions over the CORESET. In some examples, the number of CORESET TCI states includes at least one activated CORESET TCI state selected from at least one CORESET TCI state configured by an RRC message, where the at least one activated CORESET TCI state is applied to PDCCH transmissions. In some examples, the number of CORESET TCI states includes at least one CORESET TCI state configured by an RRC message.

The UE communications manager 805 may include a UE capabilities component 808, which may receive information regarding a capability of the UE to support a number of PDSCH TCI states and a number of CORESET TCI states. Information 810 including UE capability information may be passed from the UE capabilities component 808 via an electrical connection (e.g., a wire or bus) to a capability indicator transmitting component 812. The capability indicator transmitting component 812 may coordinate with a transmitter, such as transmitter 735, 1020, or 1135, as described herein, which may transmit an indicator of the capability of the UE to support the number of PDSCH TCI states and the number of CORESET TCI states. In some cases, the indicator of the capability of the UE may be transmitted by a transmitter via an electrical connection or uplink signaling to a serving base station, where the serving base station may apply the corresponding TCI state selection rule in PDSCH transmissions. In some cases, capability indicator transmitting component 812 may internally transmit or signal information 816 to a TCI state selection rule component 822. In some cases, the information 816 may be determined by a random access procedure and the number of CORESET TCI states determined to be in connected mode. In other cases, capability indicator transmitting component 812 may signal information 842 externally (e.g., to other devices, UEs, base stations, etc.).

The TCI state indicator receiving component 806 may receive, via receiver 610, 710, or 1010, information 804 that may include a MAC CE indicating the first PDSCH TCI state. In some examples, the TCI state indicator receiving component 806 may overwrite a second PDSCH TCI state that conflicts with the first received PDSCH TCI state. In some examples, the TCI state indicator receiving component 806 may receive information 814 via an electrical connection (e.g., wire or bus) or other signaling, an indication of a capability of a UE to support a number of PDSCH TCI states from capability indicator transmitting component 812.

In some examples, the TCI state indicator receiving component 806 may receive information 804, which may in some examples include an indicator of a TCI state of a first CORESET of a set of CORESETs. In some examples, the TCI state indicator receiving component 806 may receive information 804 via a receiver which in some examples may include downlink control information indicating the first PDSCH TCI state. In some examples, the TCI state indicator receiving component 806 may overwrite a second TCI state that conflicts with the first PDSCH TCI state indicated in information 804.

In some examples, the TCI state indicator receiving component 806 may receive via a receiver, information 804 which may include a CORESET including an indicator that indicates that the first PDSCH TCI state is indicated in the downlink control information. Additionally, in some examples, the TCI state indicator receiving component 806 may receive information 804, which may include an RRC message indicating the first PDSCH TCI state.

In some examples, the TCI state indicator receiving component 806 may receive via a receiver, information 804 including a configuration message configuring the UE with the set of different TCI states, where the RRC message (which may also be included in information 804) indicates that the first PDSCH TCI state is activated. In some examples, the RRC message may be the configuration message. In one example, information 804 may include a configuration message or an RRC message In some examples, the TCI state indicator receiving component 806 may receive via a receiver, information 804 (e.g., a configuration message or an RRC message) which may configure the UE with the first PDSCH TCI state, where the information 804 including the RRC message indicates that the first PDSCH TCI state is activated. In some examples, the TCI state indicator receiving component 806 may overwrite a second TCI state that conflicts with the first PDSCH TCI state, where the RRC message indicates that the first PDSCH TCI state is activated.

In some examples, the TCI state indicator receiving component 806 may receive the RRC message included in information 804, which may indicate that the first PDSCH TCI state is activated. In some examples, the TCI state indicator receiving component 806 may receive, in a CORESET communicated on a control receive beam, information 804 that includes an indication that downlink control information (e.g., information 804) does not include a TCI state indicator. In some examples, the indicator indicates an identifier of the first CORESET in a component carrier, in an activated BWP, in a TTI in which the UE is configured to monitor a search space, or in any combination thereof. In some examples, the identifier is received in information 804 as an RRC message, a control element, or downlink control information.

The TCI state selection rule component 822 may receive information 820 from TCI state indicator receiving component 806 which may include various parameters such as an indication of a TCI state selection rule in an RRC message, a control element, or downlink control information. The first PDSCH TCI state may be selected based on a number of factors. TCI state selection rule component 822 may receive information 820 via an electrical connection or other transmission signaling. TCI state selection rule component 822 may similarly receive information 816 from capability indicator transmitting component 812 corresponding to a capability of the UE 115 to support a certain number of TCI states.

In some cases, the TCI state selection rule component 822 may receive a configuration message included in information 820 via an electrical connection, which indicates a set of active CORESETs. The configuration message included in information 820 may indicate a set of active CORESETs, each of the set of active CORESETs having a respective configured TCI state of a set of TCI states, where the first configured TCI state having a lowest or highest TCI state identifier of a set of TCI state identifiers that respectively correspond to the set of TCI states.

The downlink shared channel TCI state selector 826 may select a first PDSCH TCI state among a set of different PDSCH TCI states based at least in part on information 824 it may receive from TCI state selection rule component 822, along with information 818 it may receive from capability indicator transmitting component 812 which may include the identified capability for the UE to support a number of TCI states. In some examples, the downlink shared channel TCI state selector 826 may select the first PDSCH TCI state based on whether a selection condition is satisfied (e.g., based on whether downlink control information that schedules the downlink transmission has a particular format). The information 824 may be passed via an electrical connection between TCI state selection rule component 822 and downlink shared channel TCI state selector 826. In some examples, the downlink shared channel TCI state selector 826 may select the first PDSCH TCI state from a subset of the CORESET TCI states corresponding to one of the physical downlink shared channel TCI states. In other examples, the downlink shared channel TCI state selector 826 may select the first PDSCH TCI state indicated in downlink control information based on whether a selection condition is satisfied. In some examples, the downlink shared channel TCI state selector 826 may select a downlink shared channel TCI state using a TCI state indicator if the TCI state indicator is received in information 804. In some examples, the downlink shared channel TCI state selector 826 may select a downlink shared channel TCI state to be the same as a a TCI state of a specific CORESET if a TCI state indicator is not received in information 804.

A configuration message included in information 824 may indicate a set of active CORESETs, each of the set of active CORESETs having a respective configured TCI state of a set of TCI states, the downlink shared channel TCI state selector 826 may select the first physical downlink shared channel TCI state based on a first configured TCI state of the set of TCI states, the first configured TCI state having a lowest or highest TCI state identifier of a set of TCI state identifiers that respectively correspond to the set of TCI states. In further examples, information 824 may include an indicator of a TCI state of a first CORESET of a subset of CORESETs, where the downlink shared channel TCI state selector 826 may select the TCI state of the first CORESET as the first PDSCH TCI state based on whether a selection condition is satisfied. In some cases, downlink shared channel TCI state selector 826 may select the first downlink shared channel TCI state by selecting the first physical downlink shared channel TCI state based on a configured TCI state of a first active CORESET of the number of active CORESETs. In such cases, the first active CORESET may have a lowest or highest identifier of a number of CORESET identifiers that respectively correspond to the set of active CORESETS. Downlink shared channel TCI state selector 826 may transmit information 828 via an electrical connection which may include a selection indication or other indications.

In some examples, the number of PDSCH TCI states includes at least one activated PDSCH TCI state selected using for example, downlink shared channel TCI state selector 826, from at least one PDSCH TCI state configured using information 824. The information 824 may include an RRC message, and may configure at least one activated PDSCH TCI state to be applied to PDSCH transmissions. In some examples, the number of PDSCH TCI states includes at least one PDSCH TCI state configured by an RRC message. Downlink shared channel TCI state selector 826 may further receive indication of a TCI state selection rule in an RRC message, a control element, or downlink control information included in information 824, where the downlink shared channel TCI state selector 826 may select the first PDSCH TCI state based on the TCI state selection rule.

In some examples, the set of different PDSCH TCI states includes at least one activated PDSCH TCI state selected from at least one PDSCH TCI state configured by an RRC message, where the at least one activated PDSCH TCI state is applied to PDSCH transmissions. In some examples, the set of different PDSCH TCI states includes at least one PDSCH TCI state configured by an RRC message. In some examples, a set of scheduling CORESETs respectively correspond to the subset of the CORESET TCI states. In some examples, the set of scheduling CORESETs respectively have a defined CORESET identifier in a component carrier, in an activated BWP, or both. In some examples, each of the set of scheduling CORESETs corresponds to the subset of the CORESET TCI states.

Downlink transmission monitoring component 830 may receive information 828 from downlink shared channel TCI state selector 826 passed via an electrical connection for configuring a downlink data receive beam of a receiver (e.g., receiver 610, 710, or 1010) of UE 115. The information 828 may indicate at least the first PDSCH state, and the downlink transmission monitoring component 830 may configure a set antenna weights of a receive beam of the receiver corresponding to the first PDSCH state indicated by information 828. The downlink transmission monitoring component 830, operating in combination with the receiver, may monitor for a downlink transmission 838 using the downlink data receive beam. In some cases, downlink transmission monitoring component 830 may be coupled with downlink transmission receiving component 834 via a connection 832.

The downlink transmission receiving component 834 may receive a CORESET via a control receive beam configured for a receiver of the UE. In some examples, the downlink transmission receiving component 834 may receive, via the downlink data receive beam configured for the receiver, the downlink transmission, where at least one beamforming parameter indicated in the first PDSCH TCI state is shared by the downlink data receive beam and the control receive beam. In some examples, the control receive beam and the downlink data receive beam may be the same beam. Downlink transmission receiving component 834 at the UE may receive a downlink control transmission, a downlink data transmission, or both, using the downlink data receive beam corresponding to the indicated PDSCH TCI state (e.g., the first PDSCH TCI state). The downlink transmission receiving component 834 may output information 836, such as control information or downlink data, for processing by other components of the UE 115.

Figure 9:
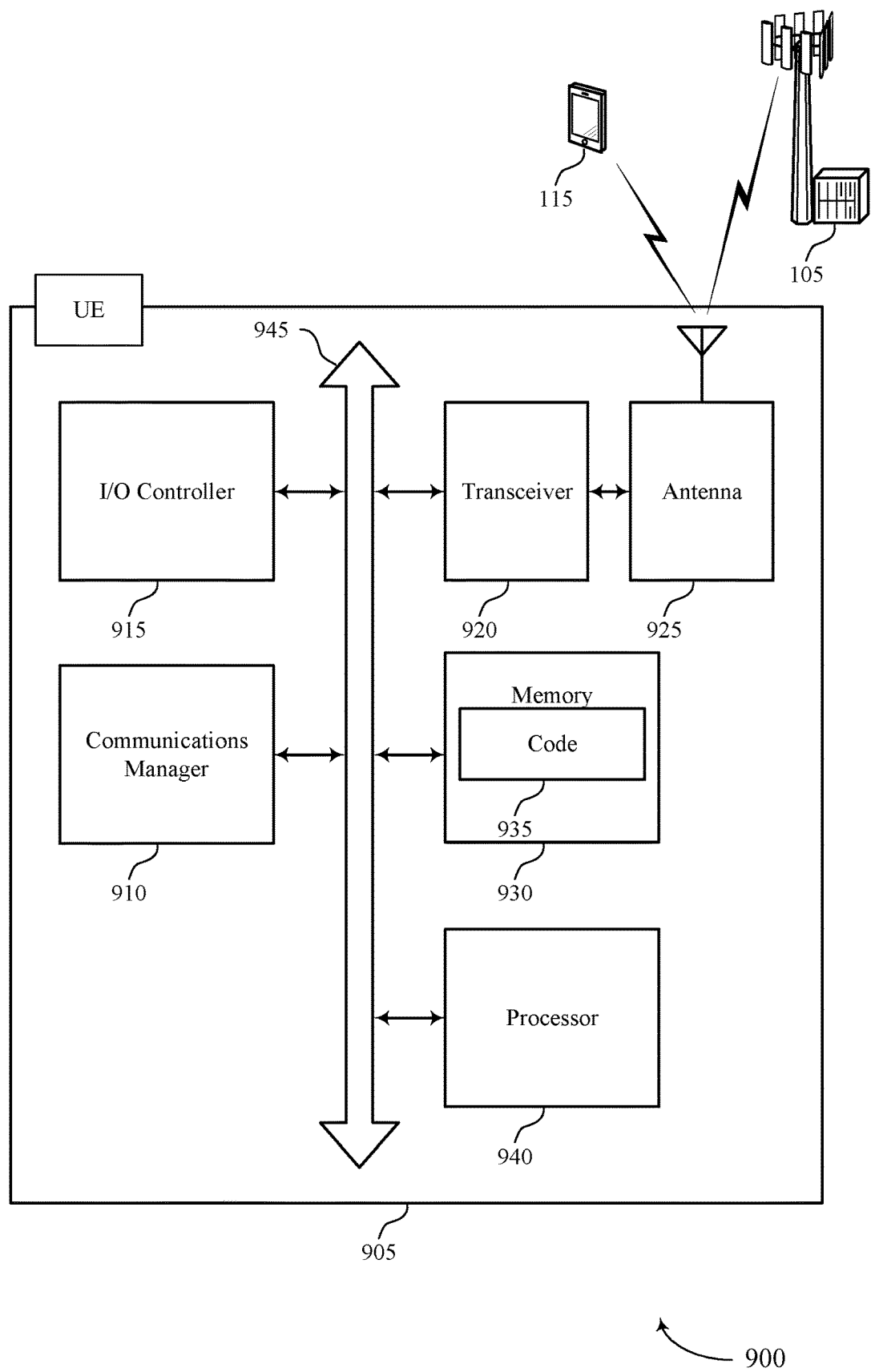
FIG. 9 shows a diagram of a system including a device that supports aspects of the invention in accordance with aspects of the present disclosure.

FIG. 9 shows a diagram of a system 900 including a device 905 that supports capability-based determination of a shared data channel TCI state in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a capability of the UE to support a number of PDSCH TCI states and a number of CORESET TCI states, select a first PDSCH TCI state among a set of different PDSCH TCI states based on the identified capability, and monitor for a downlink transmission on a downlink data receive beam based at least in part the first PDSCH TCI state.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be electrically coupled to memory 930 via bus 945, and may be configured to execute computer-readable instructions (e.g., code 935) stored in a memory (e.g., the memory 930) to cause the device 905 to perform various functions (e.g., functions or tasks supporting aspects of the invention). In some cases, processor 940 may be electrically coupled to I/O controller 915 via bus 945, and may cause I/O controller 915 to manage input and output signals for device 905.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
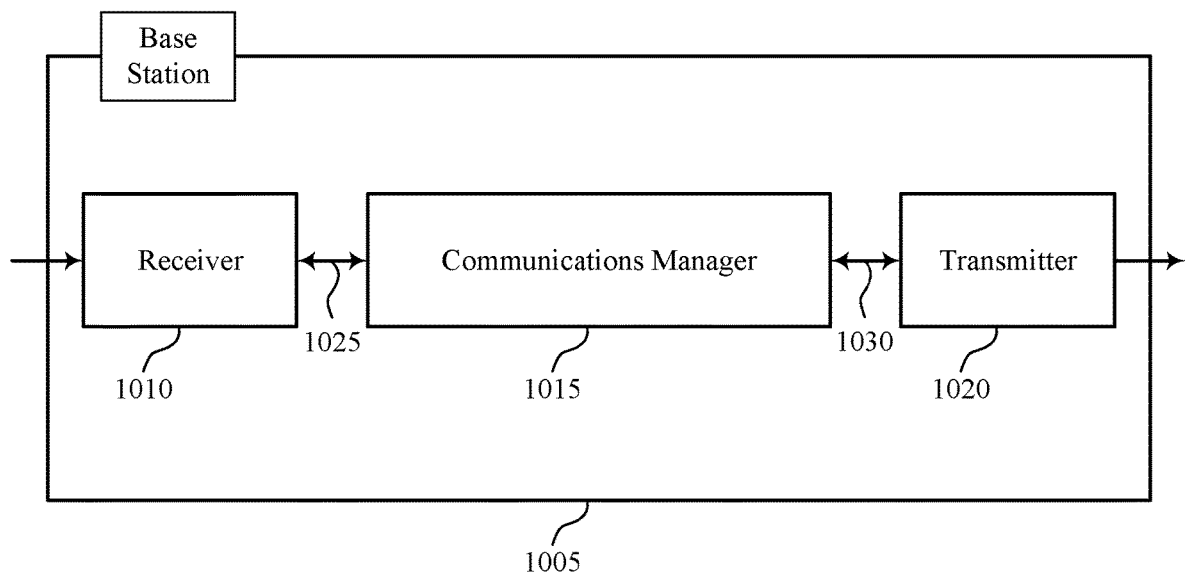
FIGS. 10 and 11 show block diagrams of devices that support aspects of the invention in accordance with aspects of the present disclosure.

FIG. 10 shows a block diagram 1000 of a device 1005 that supports capability-based determination of a shared data channel TCI state in accordance with aspects of the present disclosure. The device 1005 may be an example of aspects of a base station 105 as described herein. In some cases, the device 1005 may be an example of aspects of a gNB or an next-generation eNB (e.g., an ng-eNB) as described herein. The device 1005 may include a receiver 1010, a communications manager 1015, and a transmitter 1020. The device 1005 may also include a processor. Each of these components may be in communication with one another (e.g., via one or more buses).

The receiver 1010 may monitor a wireless channel and may receive information such as packets, user data, or control information associated with various information channels (e.g., control channels, data channels, and information related to various aspects of the invention, etc.) from a UE 115. Information 1025 may be passed on to other components of the device 1005. The receiver 1010 may transmit the received information 1025 to communications manager 1015 or one or more of the components of communications manager 1015 via an electrical connection (e.g., a wire or bus). Receiver 1010 may be an example of aspects of the transceiver 1320 described with reference to FIG. 13. The receiver 1010 may utilize a single antenna or a set of antennas.

The communications manager 1015 may receive information 1025 from the receiver 1010 via the electrical connection. Communications manager 1015 may identify a capability indicator of a capability of a UE to support a number of PDSCH TCI states and a number of CORESET TCI states, select a first PDSCH TCI state among a set of different PDSCH TCI states based on the capability, and transmit a downlink transmission on a downlink data transmission beam in accordance with the first PDSCH TCI state. The communications manager 1015 may indicate the selected first PDSCH TCI state to the UE, e.g., via MAC-CE, a TCI field in DCI, RRC message, or the TCI state used by a selected CORESET which shares the same TCI state as the PDSCH transmissions. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may receive information 1030 generated by other components of the device 1005 and transmit signals generated based on information 1030. In some cases, transmitter 1020 may receive the information 1030 from communications manager 1015 for transmitting a TCI state to the UE 115. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
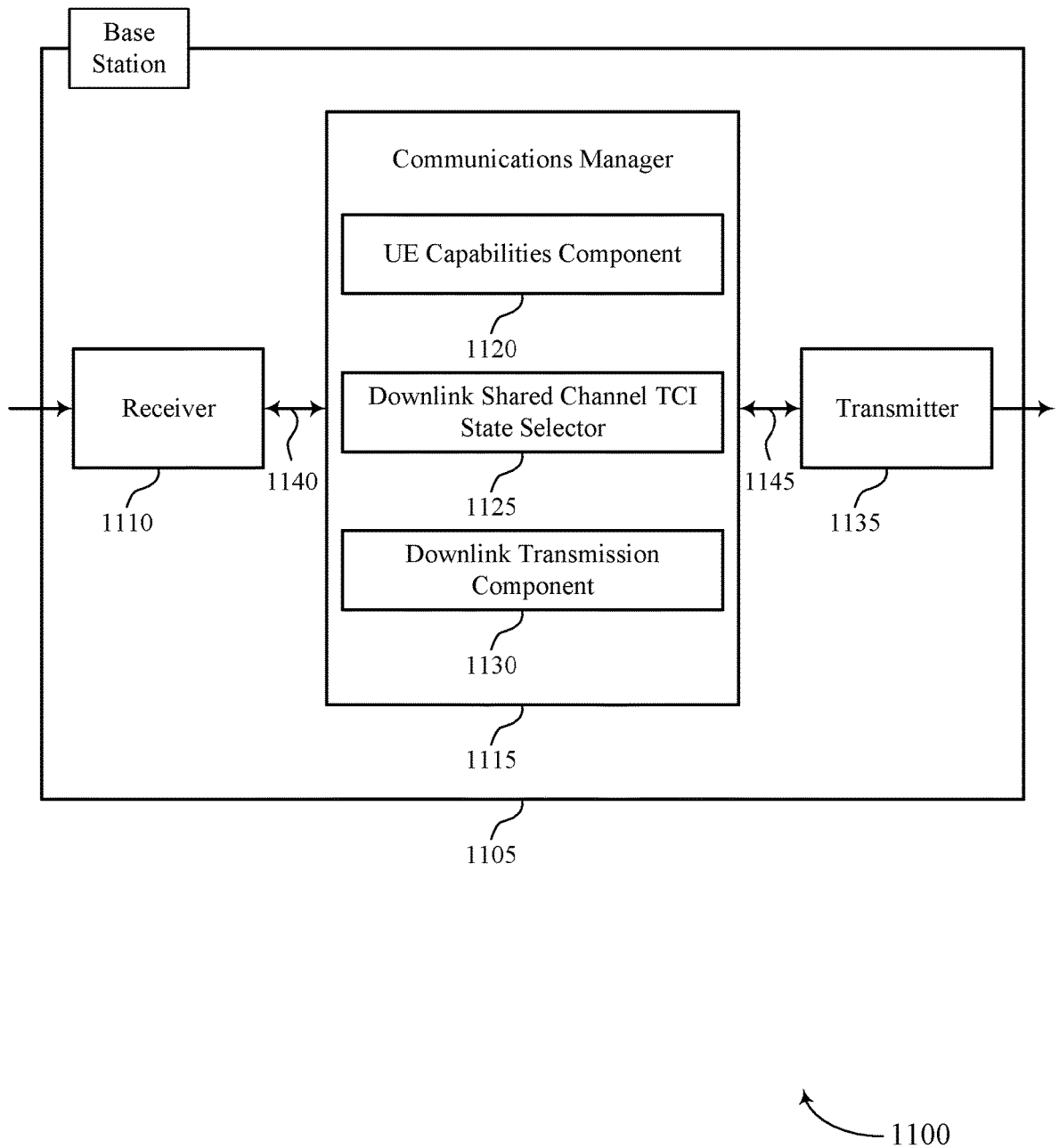

FIG. 11 shows a block diagram 1100 of a device 1105 that supports capability-based determination of a shared data channel TCI state in accordance with aspects of the present disclosure. The device 1105 may be an example of aspects of a device 1005 or a base station 105 as described herein. In some cases, the device 1105 may be an example of aspects of a gNB or an next-generation eNB (e.g., an ng-eNB) as described herein. The device 1105 may include a receiver 1110, a communications manager 1115, and a transmitter 1135. The device 1105 may also include a processor. Each of these components may be in communication with one another (e.g., via one or more buses).

The receiver 1110 may monitor a wireless channel for a transmission, and may receive information 1140 such as packets, user data, or control information associated with various information channels (e.g., control channels, data channels, and information related to various aspects of the invention, etc.). The receiver 1110 may pass information 1140 to other components of the device 1105 via an electrical connection (e.g., a wire or a bus). Receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a UE capabilities component 1120, a downlink shared channel TCI state selector 1125, and a downlink transmission component 1130. The communications manager 1115 may be an example of aspects of the communications manager 1310 described herein.

The communications manager 1115 may receive information 1140 via the electrical connection, and may direct the received information to one or more components of communications manager 1115. Communications manager 1115 may identify a capability of a UE to support a number of PDSCH TCI states and a number of CORESET TCI states, select a first PDSCH TCI state among a set of different PDSCH TCI states based on the capability, and may transmit a downlink transmission on a downlink data transmission beam in accordance with the first PDSCH TCI state.

The transmitter 1135 may receive information 1145 generated by other components of the device 1105 and transmit signals generated based on information 1145. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
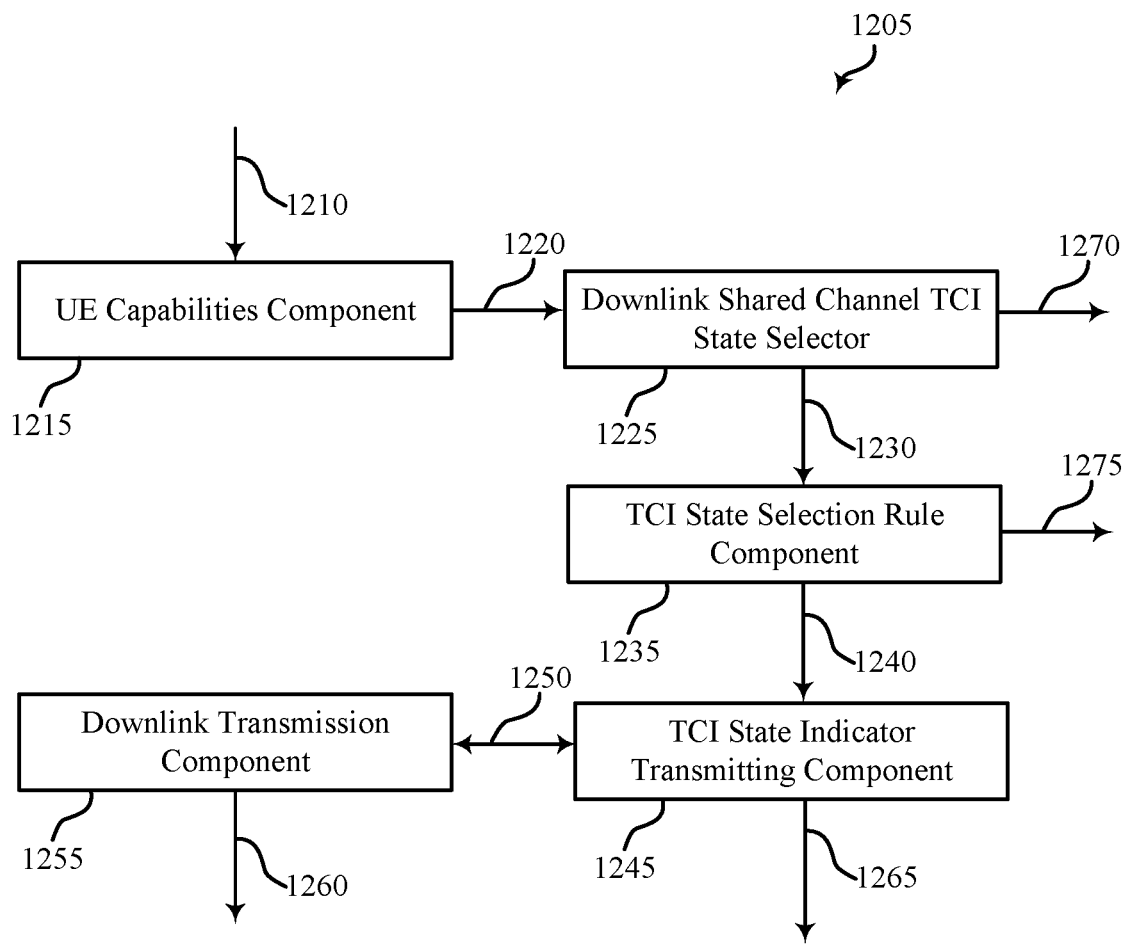
FIG. 12 shows a block diagram of a communications manager that supports aspects of the invention in accordance with aspects of the present disclosure.

FIG. 12 shows a block diagram 1200 of a communications manager 1205 that supports capability-based determination of a shared data channel TCI state in accordance with aspects of the present disclosure. The communications manager 1205 may be an example of aspects of a communications manager 1015, a communications manager 1115, or a communications manager 1310 described herein. The communications manager 1205 may include a UE capabilities component 1215, a downlink shared channel TCI state selector 1225, a TCI state selection rule component 1235, a TCI state indicator transmitting component 1245, and a downlink transmission component 1255. The communications manager 1205 may establish a connection with UE 115, and may transmit according to various signaling processes. For example, communications manager may transmit information via a transmitter (e.g., transmitter 1020, 1135, or 1320, as described with reference to FIGS. 10, 11, and 13). Each of the modules associated with communications manager 1205 may communicate, directly or indirectly, with one another (e.g., via one or more buses).

The UE capabilities component 1215 may receive from a receiver (e.g., receiver 1010, 1110, or 1320, as described herein) information including a capability indicator of a capability of a UE to support a number of PDSCH TCI states and a number of CORESET TCI states. In some examples, the capability of the UE indicates that the UE is capable of supporting a first TCI state for communication of PDCCH transmissions over a CORESET and PDCCH transmission, and a second TCI state for communication of PDCCH transmissions over the CORESET. UE capabilities component 1215 may receive information 1210 via an electronic connection (e.g., a wire or bus) with the receiver.

The downlink shared channel TCI state selector 1225 may receive information 1220 from UE capabilities component 1215 via an electrical connection, and may use the received information 1220 to select a first PDSCH TCI state among a set of different PDSCH TCI states based on the capability. In some examples, the downlink shared channel TCI state selector 1225 may select the first PDSCH TCI state from a subset of the CORESET TCI states that corresponds to one of the physical downlink shared channel TCI states. In some examples, the downlink shared channel TCI state selector 1225 may select the first PDSCH TCI state and indicate the selected first PDSCH TCI state in information 1270 transmitted to UE 115, which may in some cases be transmitted in DCI. In some examples, the set of different PDSCH TCI states includes at least one activated PDSCH TCI state selected from at least one PDSCH TCI state configured by an RRC message. In such examples, the at least one activated PDSCH TCI state is applied to PDSCH transmissions. In some examples, the set of different PDSCH TCI states includes at least one PDSCH TCI state configured by the RRC message.

The TCI state selection rule component 1235 may receive information 1230 from downlink shared channel TCI state selector 1225 regarding the set of PDSCH TCI states via an electrical connection at a receiver. TCI state selection rule component 1235 may assess various parameters associated with the selected PDSCH states, and may further select and transmit, in combination with the transmitter of the base station, an indication of a TCI state selection rule in information 1275. TCI state selection rule component may transmit information 1275 in an RRC message, a control element, or downlink control information. In some cases, the TCI state selection rule component 1235 may pass information 1240 indicating the selected TCI state selection rule to the TCI state indicator transmitting component 1245. The TCI state selection rule may indicate that if a TCI state indicator is transmitted (e.g., in a MAC CE), then the TCI state is to be selected using the TCI state indicator. Additionally, or alternatively, the TCI state selection rule may indicate that if a TCI state indicator is not transmitted, then the TCI state is to be selected using a TCI state of a specific CORESET as the activated PDSCH TCI state.

The TCI state indicator transmitting component 1245 may receive information 1240 from TCI state selection rule component 1235 of the communications manager 1205 via an electrical connection. The TCI state indicator transmitting component 1245 may transmit information using a transmitter (e.g., transmitter 1020, 1135, or 1320, described with reference to FIGS. 10, 11, and 13, respectively). The TCI state indicator transmitting component 1245 may cause a transmitter (e.g., transmitter 1020, 1135, or 1320) to transmit a signal 1265 including a MAC CE indicating the first PDSCH TCI state based at least in part on the received information 1240. In some examples, transmission of the TCI state indicator is optional. In some examples, the TCI state indicator transmitting component 1245 may select the first PDSCH TCI state based on whether a selection condition is satisfied. In some examples, the TCI state indicator transmitting component 1245 may cause a transmitter (e.g., transmitter 1020, 1135, or 1320) to transmit a signal 1265 including an indicator of a TCI state of a first CORESET of a set of CORESETs, where the TCI state of the first CORESET is selected as the first PDSCH TCI state. In some examples, a set of scheduling CORESETs correspond to a subset of the CORESET TCI states. In other examples, the set of scheduling CORESETs may have a defined CORESET identifier in a component carrier, in an activated BWP, or both. In some examples, each of the set of scheduling CORESETs may correspond to the subset of the CORESET TCI states.

In some examples, the TCI state indicator transmitting component 1245 may cause a transmitter (e.g., transmitter 1020, 1135, or 1320) to transmit the identifier in a signal 1265, where the signal may include an RRC message, a control element, or downlink control information. In some examples, the TCI state indicator transmitting component 1245 may select the TCI state of the first CORESET as the first PDSCH TCI state based at least in part on the first CORESET having a lowest or highest identifier value of the number of CORESET identifiers, or for example, based on information 1240 from TCI state selection rule component 1235. In some examples, the TCI state indicator transmitting component 1245 may transmit downlink control information indicating the first PDSCH TCI state.

In some examples, the TCI state indicator transmitting component 1245 may cause a transmitter (e.g., transmitter 1020, 1135, or 1320) to transmit signal 1265 which may include a control transmission beam further including a CORESET containing an indicator that indicates that the first PDSCH TCI state is indicated in the downlink control information. In some examples, the TCI state indicator transmitting component 1245 may select the first PDSCH TCI state indicated in the downlink control information based on whether a selection condition is satisfied. In some examples, the TCI state indicator transmitting component 1245 may cause a transmitter (e.g., transmitter 1020, 1135, or 1320) to transmit a signal 1265 including an RRC message indicating the first PDSCH TCI state. In some examples, the TCI state indicator transmitting component 1245 may transmit a signal 1265 that includes a configuration message configuring the UE with the set of different TCI states, where the RRC message indicates that the first PDSCH TCI state is activated. In some examples, the RRC message may be the configuration message. In some examples, TCI state indicator transmitting component 1245 may transmit a signal 1265 including the RRC message or configuration message.

In some examples, the TCI state indicator transmitting component 1245 may cause a transmitter (e.g., transmitter 1020, 1135, or 1320) to transmit a signal 1265 including a configuration message (e.g., an RRC message) configuring the UE with the first PDSCH TCI state, where the RRC message indicates that the first PDSCH TCI state is activated. In some examples, the TCI state indicator transmitting component 1245 may determine a format of a scheduling DCI, and may select the first PDSCH TCI that corresponds to that format. In some examples, the number of PDSCH TCI states includes at least one activated PDSCH TCI state selected from at least one PDSCH TCI state configured by the RRC message exchanged with UE 115, where the at least one activated PDSCH TCI state is applied to PDSCH transmissions. In some examples, the number of PDSCH TCI states includes at least one PDSCH TCI state configured by the RRC message. In some examples, the number of CORESET TCI states includes at least one activated CORESET TCI state selected from at least one CORESET TCI state configured by the RRC message, where the at least one activated CORESET TCI state is applied to PDCCH transmissions. In some examples, the number of CORESET TCI states includes at least one CORESET TCI state configured by the RRC message. In some cases, the capability may include a downlink beam determined by a random access procedure and a supported number of TCI states determined in a connected mode. In some examples, the TCI state indicator transmitting component 1245 may cause a transmitter (e.g., transmitter 735, 1020, or 1135) to transmit a CORESET on a control transmission beam and an indication that downlink control information does not include a TCI state indicator.

In some examples, the TCI state indicator transmitting component 1245 may cause a transmitter (e.g., transmitter 1020, 1135, or 1320) to transmit a signal 1265 including an indicator of a TCI state of a first CORESET of a set of CORESETs, where the TCI state of the first CORESET is the first PDSCH TCI state. In some examples, the first PDSCH TCI state is the same as a TCI state indicated in downlink control information. In some examples, the indicator indicates an identifier of the first CORESET in a component carrier, an activated BWP, in a latest slot in which the UE is configured to monitor a search space, or any combination thereof. In some examples, the first PDSCH TCI state is the same as a TCI state indicated in downlink control information or a control element. In some examples, the RRC message indicates that the first PDSCH TCI state is activated, and where the first PDSCH TCI state is the same as a TCI state indicated in downlink control information or a control element.

In some examples, the TCI state indicator transmitting component 1245 may cause a transmitter (e.g., transmitter 1020, 1135, or 1320) to transmit a signal 1265 including a configuration message that indicates a set of active CORESETs and transmit a MAC CE indicating the first physical downlink shared channel TCI state, where the first physical downlink shared channel TCI state is a configured TCI state of one of the set of active CORESETs.

In some examples, the TCI state indicator transmitting component 1245 may cause a transmitter (e.g., transmitter 1020, 1135, or 1320) to transmit a signal 1265 including a configuration message that indicates a set of active CORESETs, where selecting the first physical downlink shared channel TCI state includes selecting the first physical downlink shared channel TCI state based on a configured TCI state of a first active CORESET of the set of active CORESETs, the first active CORESET having a lowest or highest identifier of a plurality of CORESET identifiers that respectively correspond to the set of active CORESETs.

In some examples, the TCI state indicator transmitting component 1245 may cause a transmitter (e.g., transmitter 1020, 1135, or 1320) to transmit a signal 1265 including a configuration message that indicates a set of active CORESETs, each of the set of active CORESETs having a respective configured TCI state of a set of TCI states, where selecting the first physical downlink shared channel TCI state includes selecting the first physical downlink shared channel TCI state based on a first configured TCI state of the set of TCI states, the first configured TCI state having a lowest or highest TCI state identifier of a set of TCI state identifiers that respectively correspond to the set of TCI states. In some examples, TCI state indicator transmitting component 1245 may provide an indication 1250 of the first PDSCH TCI state to the downlink transmission component 1255.

The downlink transmission component 1255 may receive indication 1250 of a TCI state from TCI state indicator transmitting component 1245 via an electrical connection. The downlink transmission component 1255 may further cause a transmitter (e.g., transmitter 1020, 1135, or 1320) to transmit a downlink transmission 1260 on a downlink data transmission beam in accordance with the first PDSCH TCI state. In some examples, the downlink transmission component 1255 may cause a transmitter to transmit a CORESET via a control transmission beam having at least one beamforming parameter indicated in the first PDSCH TCI state that is shared by the downlink data transmission beam. Downlink transmission component 1255 may transmit a signal generated based on indication 1250 using a transmitter (e.g., transmitter 1020, 1135, or 1320).

Figure 13:
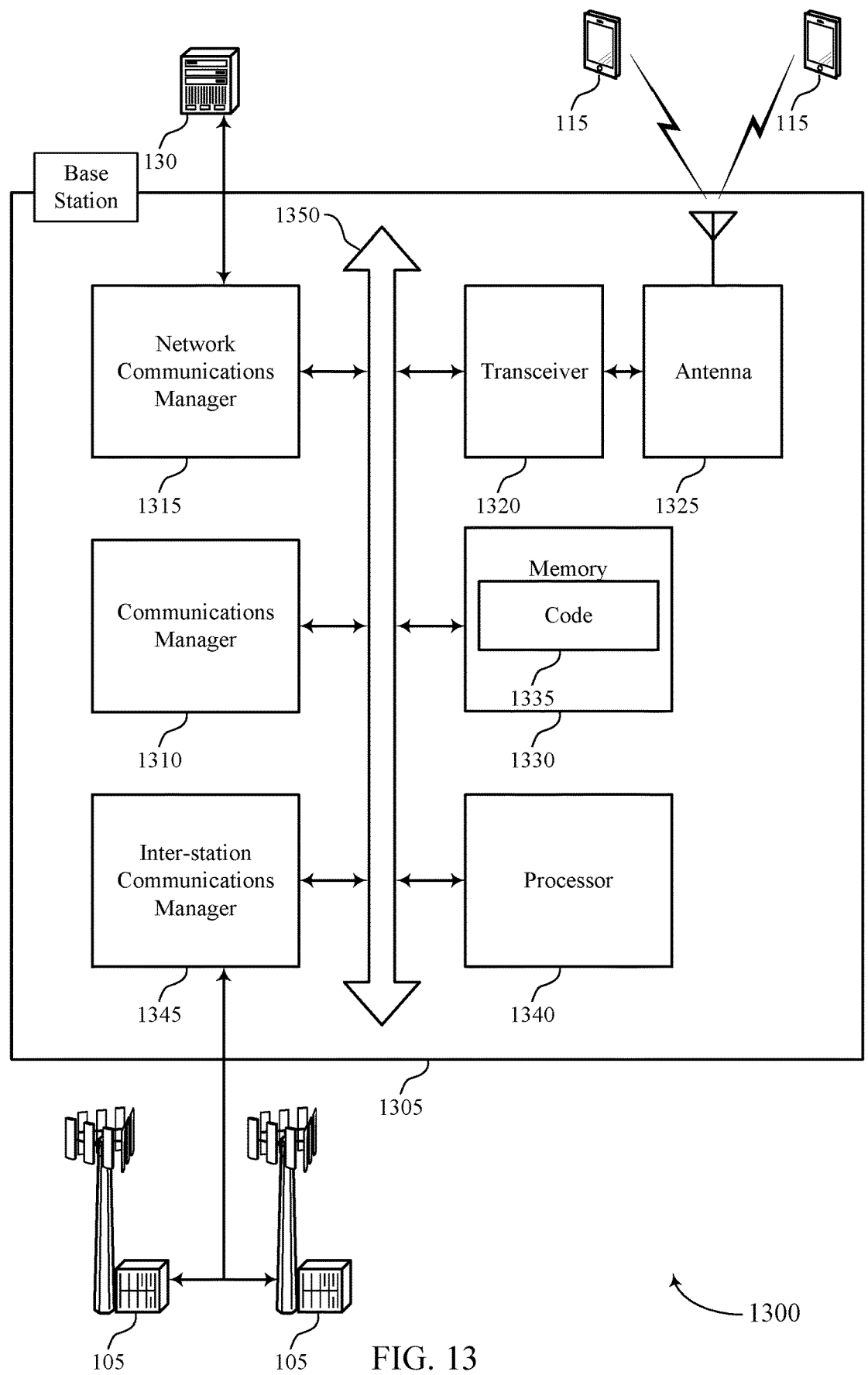
FIG. 13 shows a diagram of a system including a device that supports aspects of the invention in accordance with aspects of the present disclosure.

FIG. 13 shows a diagram of a system 1300 including a device 1305 that supports capability-based determination of a shared data channel TCI state in accordance with aspects of the present disclosure. The device 1305 may be an example of or include the components of device 1005, device 1105, or a base station 105 as described herein. In some cases, the device 1005 may be an example or include the components of a gNB or an next-generation eNB (e.g., an ng-eNB) as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via bus 1350.

The communications manager 1310 may receive a capability indicator of a capability of a UE to support a number of PDSCH TCI states and a number of CORESET TCI states, select a first PDSCH TCI state among a set of different PDSCH TCI states based on the capability, and transmit a downlink transmission on a downlink data transmission beam in accordance with the first PDSCH TCI state.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, transceiver 1320 may transmit a capability of a UE or a PDSCH-TCI state via antenna 1325.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330), electrically coupled to processor 1340 via bus 1350, to cause the device 1305 to perform various functions (e.g., functions or tasks supporting capability-based determination of a shared data channel TCI state). In some cases, processor 1340 may execute the instructions based on the information transmitted by transceiver 1320 via bus 1350. In some cases, processor 1340 may cause communications manager 1310, electrically coupled to processor 1340 via bus 1350, to perform the various functions described herein. In some cases, processor 1340 may execute the instructions based on signals received from network communications manager 1315 via bus 1350 or inter-station communications manager 1345 via bus 1350 for managing communications with a core network 130 and one or more other base stations 105, respectively.

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
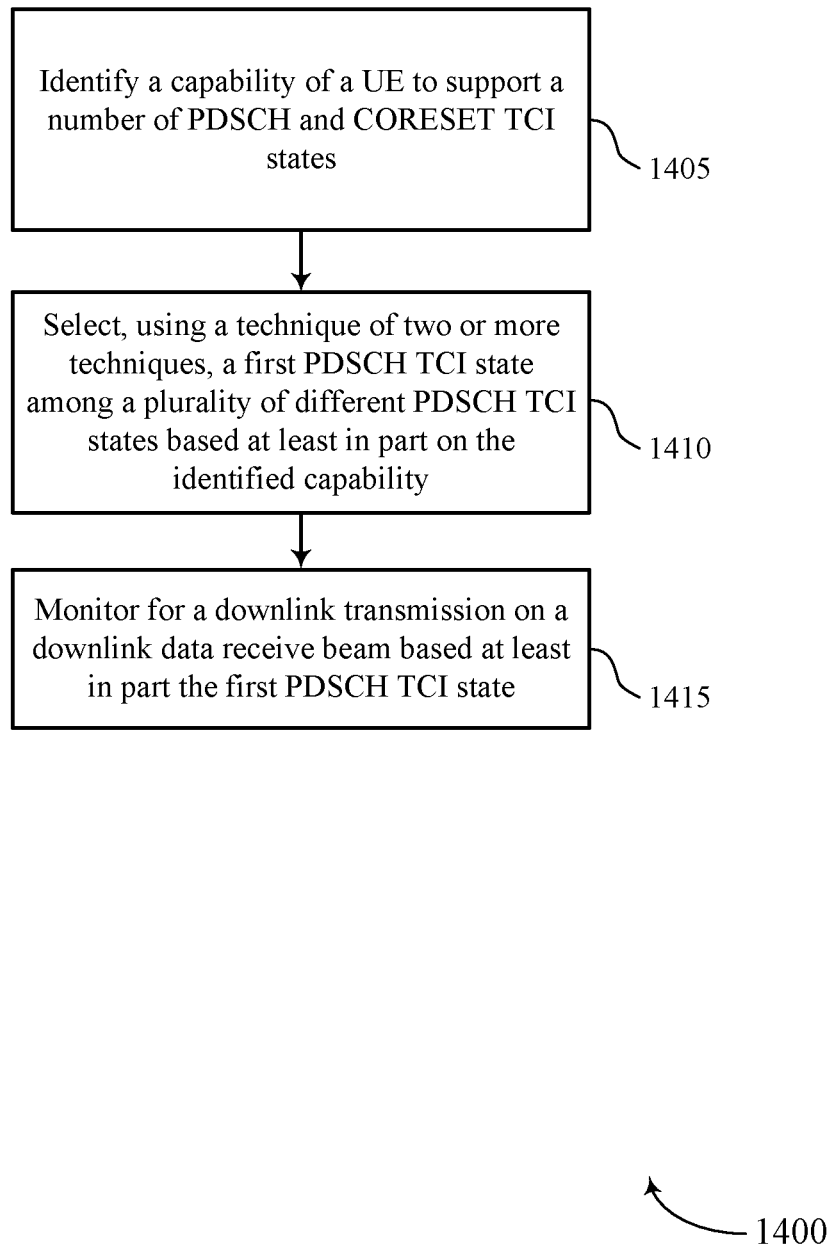
FIGS. 14 through 18 show flowcharts illustrating methods that support aspects of the invention in accordance with aspects of the present disclosure.

FIG. 14 shows a flowchart illustrating a method 1400 that supports capability-based determination of a shared data channel TCI state in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions or code to control the functional elements of the UE to perform the functions described below. Additionally or alternatively, a UE may perform aspects of the functions described below using special-purpose hardware.

At 1405, the UE may identify a capability of the UE to support a number of PDSCH TCI states and a number of CORESET TCI states. In some cases, a UE may utilize a capabilities component (e.g., UE capabilities component 808 or 1215 as described herein) to retrieve capability information from a memory component (e.g., memory 1330, and code 1335 stored in the memory, as described herein). In other cases, the UE may use the capabilities component to determine capability information based on a certain operating state (e.g., the UE may operate using a reduced capability set to conserve power, to omit capabilities not needed in certain use cases, etc.). The UE may employ various methods to determine the number of PDSCH TCI states and the number of CORESET TCI states it is capable of supporting. For example, the UE may determine that it is a reduced capability UE, or that it is operating in a reduced capability state. In such cases, the UE may determine it may support fewer activated PDSCH TCI states than CORESET TCI states. The operations of 1405 may be performed according to the methods described herein. In some examples, aspects of the operations of 1405 may be performed by a UE capabilities component as described with reference to FIGS. 6 through 9.

At 1410, the UE may select, using a technique of two or more techniques, a first PDSCH TCI state among a set of different PDSCH TCI states based on the identified capability. In some cases, the UE may utilize a state selector component (e.g., downlink shared channel TCI state selector 826, as described herein) to select the first PDSCH TCI state. The state selector component may select the first TCI state from a number of candidate TCI states configured to the UE. In some examples, the first PDSCH TCI state may be selected using a first technique (of the two or more techniques) that selects the first PDSCH TCI state based at least in part on a message received from a base station. In some examples, the first PDSCH state may be selected using a second technique (of the two or more techniques) that selects the first PDSCH TCI state to follow a TCI state or be quasi co-located with a CORESET configured for the UE. In some examples, the first PDSCH TCI state may be selected using the first technique if the message is received from the base station and may be selected using the second technique if the message is not received from the base station.

In some examples, the first TCI state may be indicated as part of direct signaling based on various factors (e.g., scheduling offset of PDSCH relative to PDSCH), and the state selector component may select the indicated TCI state. The state selector component may further select the first PDSCH TCI state according to the identified capability. For example, a UE may determine an ability to operate in a reduced capability state, and the state selector component may select a first TCI state in accordance with the reduced capability. For example, a selection component at the UE may select a TCI state indicated by a media access control (MAC) control element (CE) as the activated PDSCH TCI state. In another example, the UE may use the TCI state of a specific CORESET as the activated PDSCH TCI state. In some examples, the UE may use a TCI state indicated in scheduling downlink control information (DCI) as the activated PDSCH TCI state. Or, in another example, the UE may use a PDSCH TCI state selected by a radio resource control (RRC) message as the activated PDSCH TCI state. The operations of 1410 may be performed according to the methods described herein. In some examples, aspects of the operations of 1410 may be performed by a downlink shared channel TCI state selector as described with reference to FIGS. 6 through 9.

At 1415, the UE may monitor for a downlink transmission on a downlink data receive beam based at least in part the first PDSCH TCI state. In some cases, the UE may utilize a monitoring component (e.g., downlink transmission monitoring component 830 as described herein) to monitor for the downlink transmission on the downlink data receive beam using a number of channel monitoring techniques. In some cases, a beam indication (e.g., as a part of downlink beamforming) may be based on the configuration of the first PDSCH TCI state, where the first PDSCH TCI state may include reference signal information among other components. The monitoring component may associate a subsequent downlink transmission with the first PDSCH TCI state, and may assume the subsequent downlink transmission is transmitted using at least similar parameters (e.g., using the same spatial filter as the PDSCH TCI state and related reference signal). The monitoring component may further adjust the downlink data receive beam based on the information contained in the first PDSCH TCI state (e.g., scheduling information, PDSCH state information, etc.). The operations of 1415 may be performed according to the methods described herein. In some examples, aspects of the operations of 1415 may be performed by a downlink transmission monitoring component as described with reference to FIGS. 6 through 9.

Figure 15:
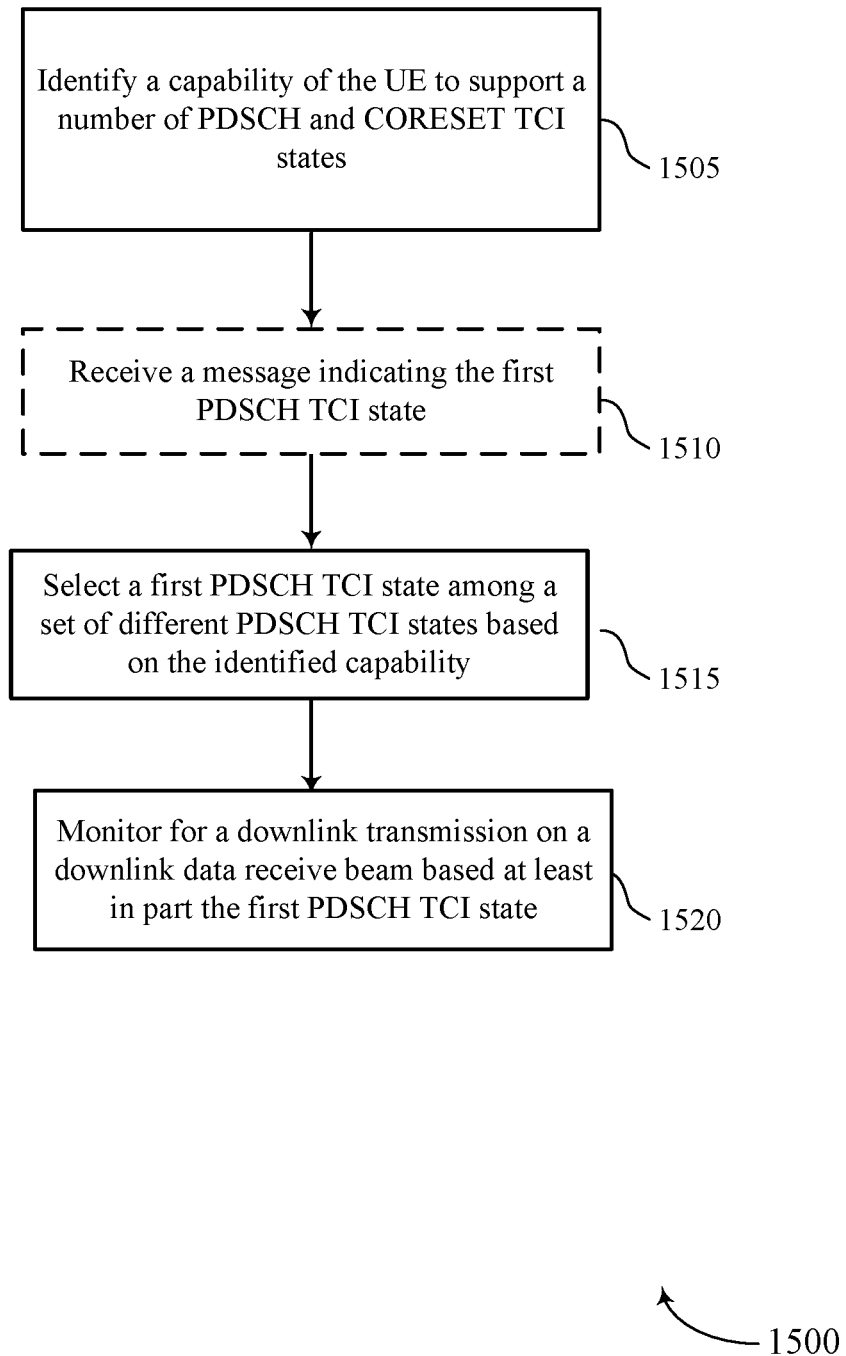

FIG. 15 shows a flowchart illustrating a method 1500 that supports capability-based determination of a shared data channel TCI state in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a capability of the UE to support a number of PDSCH TCI states and a number of CORESET TCI states. In some cases, a UE may utilize a capabilities component (e.g., UE capabilities component 808 as described herein) to retrieve capability information from a memory component (e.g., memory 1330, and code 1335 stored in the memory, as described herein). In other cases, the UE may use the capabilities component to determine capability information based on a certain operating state that the UE may be operating in accordance with (e.g., the UE may operate using a reduced capability set to conserve power, to omit capabilities not needed in certain use cases, etc.). The UE may employ various methods to determine the number of PDSCH TCI states and the number of CORESET TCI states it is capable of supporting. For example, the UE may determine that it is a reduced capability UE, or that it is operating in a reduced capability state. In such cases, the UE may determine it may support fewer activated PDSCH TCI states than CORESET TCI states. The operations of 1505 may be performed according to the methods described herein. In some examples, aspects of the operations of 1505 may be performed by a UE capabilities component as described with reference to FIGS. 6 through 9.

At 1510, the UE may optionally receive a message (e.g., a MAC CE) indicating a first PDSCH TCI state. In some cases, the UE may utilize a receiving component (e.g., TCI state indicator receiving component 806, as described herein) to monitor time and frequency resources to receive the MAC CE. The receiving component operate in combination with a receiver (e.g., receiver 610, 710, or 920, as described herein. In some examples, the MAC CE may activate a number of candidate TCI states including the first PDSCH TCI state. One of the activated candidate TCI states may be indicated as the first PDSCH TCI state by the MAC CE. The UE may receive the MAC CE in a downlink message or configured downlink data receive beam at the receiver. The operations of 1510 may be performed according to the methods described herein. In some examples, aspects of the operations of 1510 may be performed by a TCI state indicator receiving component as described with reference to FIGS. 6 through 9.

At 1515, the UE may select the first PDSCH TCI state among a set of different PDSCH TCI states based on the identified capability. In some cases, the UE may utilize a state selector component (e.g., downlink shared channel TCI state selector 826, as described herein) to select the first PDSCH TCI state. The state selector component may select the first TCI state from a number of candidate TCI states configured to the UE. In some examples, the first TCI state may be indicated as part of direct signaling based on various factors (e.g., scheduling offset of PDSCH relative to PDSCH), and the state selector component may select the indicated TCI state. The state selector component may further select the first PDSCH TCI state according to the identified capability. For example, a UE may determine an ability to operate in a reduced capability state, and the state selector component may select a first TCI state in accordance with the reduced capability. For example, a state selector component at the UE may select a TCI state indicated by a message from the base station (e.g., a MAC CE) if the message is received by the UE. In another example, the UE may use the TCI state of a specific CORESET as the activated PDSCH TCI state if the message is not received from the base station. In some examples, the UE may use a TCI state indicated in scheduling downlink control information (DCI) as the activated PDSCH TCI state. Or, in another example, the UE may use a PDSCH TCI state selected by a radio resource control (RRC) message as the activated PDSCH TCI state. The operations of 1515 may be performed according to the methods described herein. In some examples, aspects of the operations of 1515 may be performed by a downlink shared channel TCI state selector as described with reference to FIGS. 6 through 9.

At 1520, the UE may monitor for a downlink transmission on a downlink data receive beam based at least in part the first PDSCH TCI state. In some cases, the UE may utilize a monitoring component (e.g., downlink transmission monitoring component 830 as described herein) to monitor for the downlink transmission on the downlink data receive beam using a number of channel monitoring techniques. In some cases, a beam indication (e.g., as a part of downlink beamforming) may be based on the configuration of the first PDSCH TCI state, where the first PDSCH TCI state may include reference signal information among other components. The monitoring component may associate a subsequent downlink transmission with the first PDSCH TCI state, and may assume the subsequent downlink transmission is transmitted using at least similar parameters (e.g., using the same spatial filter as the PDSCH TCI state and related reference signal). The monitoring component may further adjust the downlink data receive beam based on the information contained in the first PDSCH TCI state (e.g., scheduling information, PDSCH state information, etc.). The operations of 1520 may be performed according to the methods described herein. In some examples, aspects of the operations of 1520 may be performed by a downlink transmission monitoring component as described with reference to FIGS. 6 through 9.

Figure 16:
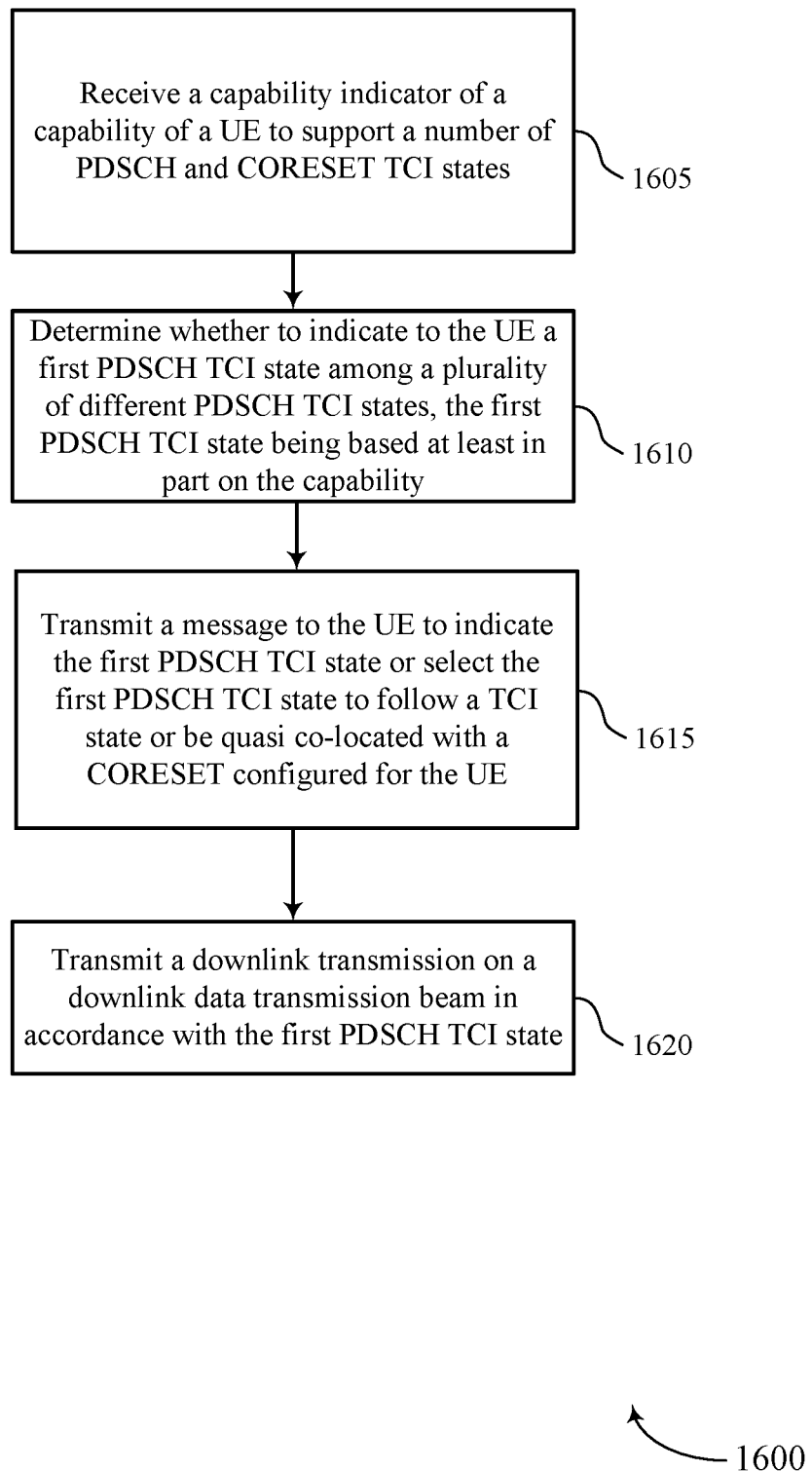

FIG. 16 shows a flowchart illustrating a method 1600 that supports capability-based determination of a shared data channel TCI state in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may receive a capability indicator of a capability of a UE to support a number of PDSCH TCI states and a number of CORESET TCI states. In some cases, a base station may utilize a capabilities component (e.g., a UE capabilities component 1215) in combination with a receiver, such as receiver 1010, 1110, or 1320, as described herein to receive the capability indicator from the UE. In some cases, the capabilities component may process the capability indicator to determine capability information based on a certain operating state the UE may be operating in accordance with (e.g., the UE may operate using a reduced capability set to conserve power, etc.). The capabilities component may receive information contained in the capability indication related to the number of PDSCH TCI states and the number of CORESET TCI states the UE is capable of supporting, and further what states the base station may configure for the UE. In an example, the capabilities component may determine that the UE is to be configured as a reduced capability UE. In such cases, the capabilities component may configure the UE with fewer activated PDSCH TCI states than CORESET TCI states. The operations of 1605 may be performed according to the methods described herein. In some examples, aspects of the operations of 1605 may be performed by a UE capabilities component as described with reference to FIGS. 10 through 13.

At 1610, the base station may determine whether to indicate to the UE a first PDSCH TCI state among a plurality of different PDSCH TCI states, the first PDSCH TCI state being based at least in part on the capability. In some cases, the base station may utilize a state selector component (e.g., TCI state selector component 1225, as described herein) to select the first PDSCH TCI state. The state selector component may select the first TCI state from a number of candidate TCI states it may configure for the UE. In some examples, the first PDSCH TCI state may be selected using a first technique (of the two or more techniques) that selects the first PDSCH TCI state based at least in part on a message transmitted to the UE. In some examples, the first PDSCH state may be selected using a second technique (of the two or more techniques) that selects the first PDSCH TCI state to follow a TCI state or be quasi co-located with a CORE-SET configured for the UE. In some examples, the first PDSCH TCI state may be selected using the first technique if the message is transmitted to the UE and may be selected using the second technique if the message is not transmitted to the UE.

In some examples, the state selector component may select the indicated TCI state based on various factors (e.g., scheduling offset of PDSCH relative to PDSCH) and the base station may indicate the first TCI state in signaling. The selection component may further select the first PDSCH TCI state according to the received capability indicator. For example, the capability indicator may indicate the UE as capable of operating in a reduced capability state, and the state selector component may select a first TCI state in accordance with the reduced capability indication. In some examples, and the state selector component may select a TCI state indicated by a media access control (MAC) control element (CE) as the activated PDSCH TCI state. In another example, the state selector may use the TCI state of a specific CORESET as the activated PDSCH TCI state. The state selector may further use a TCI state indicated in scheduling downlink control information (DCI) as the activated PDSCH TCI state. Or, in another example, the state selector may use a PDSCH TCI state configured in a radio resource control (RRC) message as the activated PDSCH TCI state. The operations of 1610 may be performed according to the methods described herein. In some examples, aspects of the operations of 1610 may be performed by a downlink shared channel TCI state selector as described with reference to FIGS. 10 through 13.

At 1615, the base station may transmit a message to the UE to indicate the first PDSCH TCI state or may select the first PDSCH TCI state to follow a TCI state or be quasi co-located with a CORESET configured for the UE. For example, the base station may transmit a message to the UE to indicate the first PDSCH TCI state responsive to a determination to indicate to the UE the first PDSCH TCI state. Additionally, or alternatively, the base station may select the first PDSCH TCI state to follow (or assume that the first PDSCH TCI state follows) a TCI state or be quasi co-located with a CORESET configured for the UE responsive to a determination not to indicate to the UE the first PDSCH TCI state.

At 1620, the base station may transmit a downlink transmission on a downlink data transmission beam in accordance with the first PDSCH TCI state. The base station may utilize a downlink transmission component (e.g., downlink transmission component 1255) in combination with a transmitter (e.g., transmitter 735, 1020, or 1135, as described herein) to transmit the downlink transmission on the downlink data transmission beam. The base station may employ various transmission techniques at the transmitter such as for example, downlink beamforming. The downlink transmission component may configure a number of TCI states for the UE based on the capability indicator, and may select a first PDSCH TCI state to indicate in a downlink transmission to the UE, based on a capability indicator the base station receives from the UE. The downlink transmission component may further utilize RRC signaling to assign a certain number of candidate TCI states to a configured CORESET. The operations of 1615 may be performed according to the methods described herein. In some examples, aspects of the operations of 1615 may be performed by a downlink transmission component as described with reference to FIGS. 10 through 13.

Figure 17:
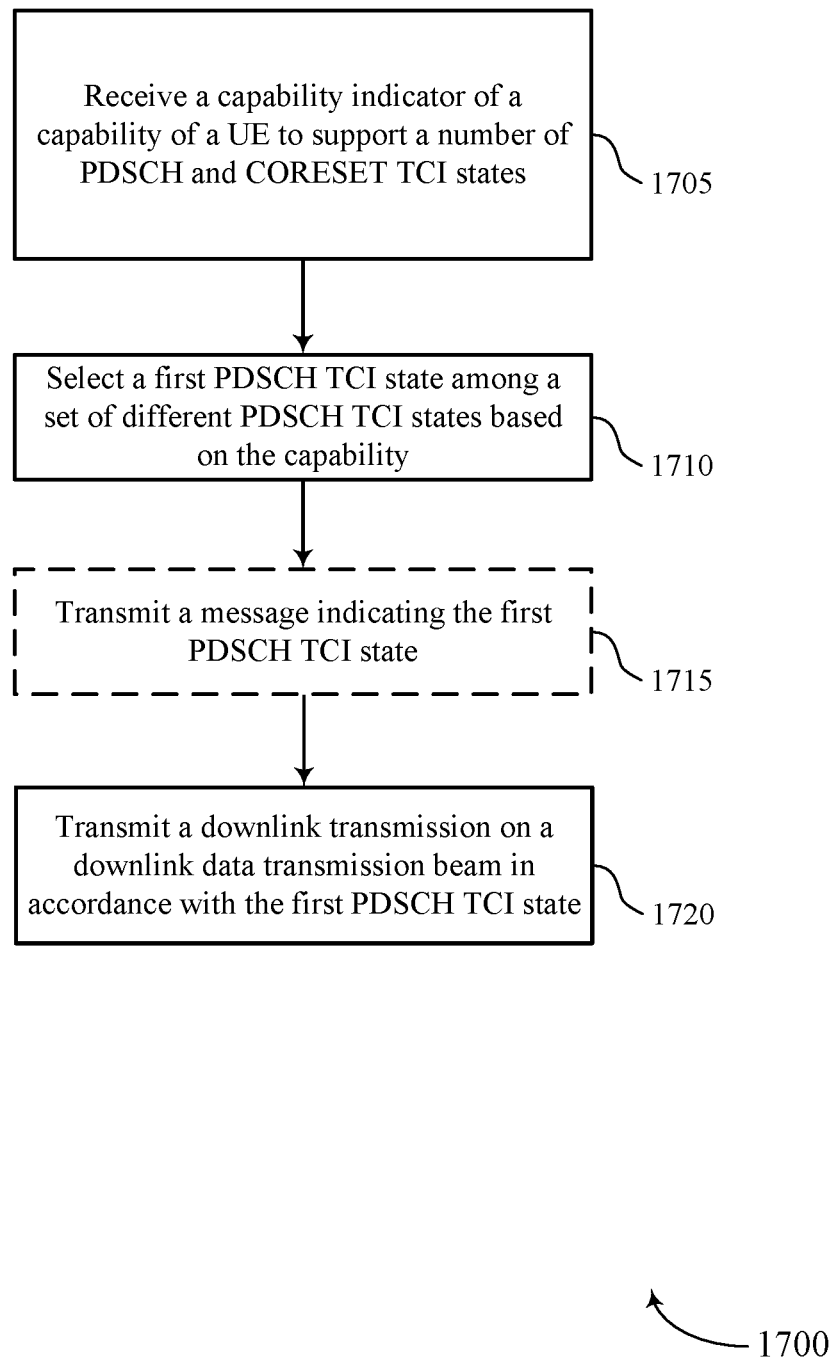

FIG. 17 shows a flowchart illustrating a method 1700 that supports capability-based determination of a shared data channel TCI state in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive a capability indicator of a capability of a UE to support a number of PDSCH TCI states and a number of CORESET TCI states. In some cases, a base station may utilize a capabilities component (e.g., UE capabilities component 1215) in combination with a receiver, such as receiver 610, 710, 1010, or 1110, as described herein to receive the capability indicator from the UE. In some cases, the capabilities component may use the capability indicator to determine capability information based on a certain operating state the UE may be operating in accordance with (e.g., the UE may operate using a reduced capability set to conserve power, etc.). The capabilities component may receive information contained in the capability indication related to the number of PDSCH TCI states and the number of CORESET TCI states the UE is capable of supporting, and further what states the base station may configure for the UE. In an example, the capabilities component may determine that the UE is to be configured as a reduced capability UE. In such cases, the capabilities component may configure the UE with fewer activated PDSCH TCI states than CORESET TCI states. The operations of 1705 may be performed according to the methods described herein. In some examples, aspects of the operations of 1705 may be performed by a UE capabilities component as described with reference to FIGS. 10 through 13.

At 1710, the base station may select a first PDSCH TCI state among a set of different PDSCH TCI states based on the capability. In some cases, the base station may utilize a state selector component (e.g., TCI state selector component 1225, as described herein) to select the first PDSCH TCI state. The selection component may select the first TCI state from a number of candidate TCI states it may configure for the UE. In some examples, the state selector component may select the TCI state based on various factors (e.g., scheduling offset of PDSCH relative to PDSCH), and may signal the first TCI state. The state selector component may further select the first PDSCH TCI state according to the received capability indicator. For example, the capability indicator may indicate the UE as capable of operating in a reduced capability state, and the state selector component may select a first TCI state in accordance with the reduced capability indication. In some examples, the state selector component may indicate a TCI state in a message (e.g., a MAC CE) as the activated PDSCH TCI state, such as when the message is transmitted to the UE. In another example, the base station may use the TCI state of a specific CORESET as the activated PDSCH TCI state, such as when the message (e.g., the MAC CE) indicating a TCI state is not transmitted to the UE. The base station may further use a TCI state indicated in scheduling downlink control information (DCI) as the activated PDSCH TCI state. Or, in another example, the base station may use a PDSCH TCI state configured in a radio resource control (RRC) message as the activated PDSCH TCI state. The operations of 1710 may be performed according to the methods described herein. In some examples, aspects of the operations of 1710 may be performed by a downlink shared channel TCI state selector as described with reference to FIGS. 10 through 13.

At 1715, the base station may optionally transmit a message (e.g., a MAC CE) indicating the first PDSCH TCI state. In some cases, the base station may ensure that the selected PDSCH TCI state is one (e.g., one of the two) active CORESET TCI states. The base station may utilize a TCI state indicator transmitting component (e.g., TCI state indicator transmitting component 1245) in combination with a transmitter (e.g., transmitter 1020, 1135, or 1320, as described herein) to transmit the MAC CE indicating the first PDSCH TCI state. The TCI state indicator transmitting component may configure a downlink data transmission beam in accordance with various transmission techniques (such as beamforming) to transmit the MAC CE. In some examples, the MAC CE may activate a number of candidate TCI states including the first PDSCH TCI state. One of the activated candidate TCI states may be indicated as the first PDSCH TCI state by the MAC CE. The TCI state indicator transmitting component may transmit the MAC CE in a downlink message or configured downlink data receive beam. The operations of 1715 may be performed according to the methods described herein. In some examples, aspects of the operations of 1715 may be performed by a TCI state indicator transmitting component as described with reference to FIGS. 10 through 13.

At 1720, the base station may transmit a downlink transmission on a downlink data transmission beam in accordance with the first PDSCH TCI state. The base station may utilize a downlink transmission component (e.g., downlink transmission component 1255) in combination with a transmitter (e.g., transmitter 1020, 1135, or 1320, as described herein) to transmit the downlink transmission on the downlink data transmission beam. The base station may employ various transmission techniques at the transmitter such as for example, downlink beamforming. The base station may configure a number of TCI states for the UE based on the capability indicator, and may select a first PDSCH TCI state to indicate in a downlink transmission to the UE, based on a capability indicator the base station may receive from the UE. The base station may further utilize RRC signaling to assign a certain number of candidate TCI states to a configured CORESET. The operations of 1720 may be performed according to the methods described herein. In some examples, aspects of the operations of 1720 may be performed by a downlink transmission component as described with reference to FIGS. 10 through 13.

Figure 18:
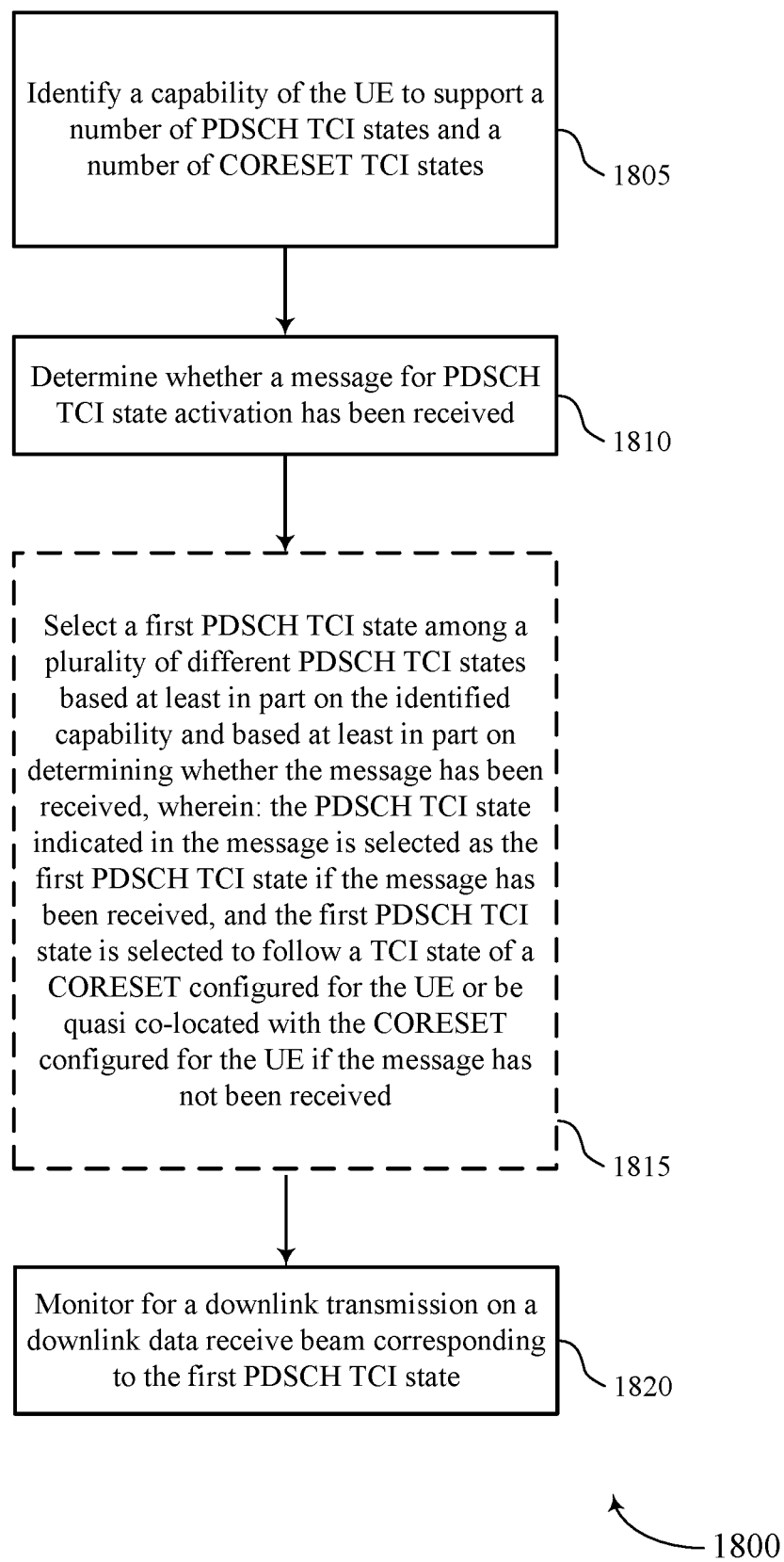

FIG. 18 is a diagram illustrating an example process 1800 performed, for example, by a UE, in accordance with various aspects of the present disclosure. Example process 1800 is an example where the UE (e.g., UE 120 and/or the like) performs operations associated with capability-based determination of a shared data channel TCI state.

As shown in FIG. 18, in some aspects, process 1800 may include identifying a capability of the UE to support a number of PDSCH TCI states and a number of CORESET TCI states (block 1805). For example, the UE (e.g., using receive processor 258, controller/processor 280, memory 282, and/or the like) may identify a capability of the UE to support a number of PDSCH TCI states and a number of CORESET TCI states, as described above.

As further shown in FIG. 18, in some aspects, process 1800 may include determining whether a message for PDSCH TCI state activation has been received (block 1810). For example, the UE (e.g., using receive processor 258, controller/processor 280, memory 282, and/or the like) may determine whether a message for PDSCH TCI state activation has been received, as described above.

As further shown in FIG. 18, in some aspects, process 1800 may include selecting a first PDSCH TCI state among a plurality of different PDSCH TCI states based at least in part on the identified capability and based at least in part on determining whether the message has been received, wherein: the PDSCH TCI state indicated in the message is selected as the first PDSCH TCI state if the message has been received, and the first PDSCH TCI state is selected to follow a TCI state of a CORESET configured for the UE or be quasi co-located with the CORESET configured for the UE if the message has not been received (block 1815). For example, the UE (e.g., using receive processor 258, controller/processor 280, memory 282, and/or the like) may select a first PDSCH TCI state among a plurality of different PDSCH TCI states based at least in part on the identified capability and based at least in part on determining whether the message has been received, as described above. If the message has been received, then the UE may select the PDSCH TCI state indicated in the message as the first PDSCH TCI state. If the message has not been received, then the UE may select the first PDSCH TCI state to follow a TCI state of a CORESET configured for the UE or be quasi co-located with the CORESET configured for the UE.

As further shown in FIG. 18, in some aspects, process 1800 may include monitoring for a downlink transmission on a downlink data receive beam corresponding to the first PDSCH TCI state (block 1820). For example, the UE (e.g., using receive processor 258, controller/processor 280, memory 282, and/or the like) may monitor for a downlink transmission on a downlink data receive beam corresponding to the first PDSCH TCI state, as described above.

Process 1800 may include additional aspects, such as any single aspect or any combination of aspects described below and/or in connection with one or more other processes described elsewhere herein.

In a first aspect, the number of PDSCH TCI states comprises a number of PDSCH TCI states active for transmission.

In a second aspect, alone or in combination with the first aspect, the capability indicates a downlink beam determined by a random access procedure and the number of CORESET TCI states determined in connected mode.

In a third aspect, alone or in combination with one or more of the first and second aspects, process 1800 includes receiving a configuration message that indicates a plurality of active CORESETs, wherein the first PDSCH TCI state is selected based at least in part on a configured TCI state of a first active CORESET of the plurality of active CORESETs, the first active CORESET having a lowest or highest identifier of a plurality of CORESET identifiers that respectively correspond to the plurality of active CORESETs.

In a fourth aspect, alone or in combination with one or more of the first through third aspects, the message is a medium access control (MAC) control element (CE) for PDSCH TCI activation.

In a fifth aspect, alone or in combination with one or more of the first through fourth aspects, the first PDSCH TCI state is selected based at least in part on a configured TCI state of a first CORESET of a plurality of CORESETs configured for the UE, the first CORESET having a lowest or highest identifier of a plurality of CORESET identifiers that respectively correspond to the plurality of CORESETs configured for the UE if the message has not been received.

In a sixth aspect, alone or in combination with one or more of the first through fifth aspects, the first PDSCH TCI state is selected based at least in part on a configured TCI state of a first CORESET of a plurality of CORESETs in a latest monitored transmission time interval, the first CORESET having a lowest or highest identifier of a plurality of CORESET identifiers that respectively correspond to the plurality of CORESETs in the latest monitored transmission time interval if the message has not been received.

In a seventh aspect, alone or in combination with one or more of the first through sixth aspects, the first PDSCH TCI state is selected based at least in part on a determination that the UE is configured with two different active CORESET TCI states.

In an eighth aspect, alone or in combination with one or more of the first through seventh aspects, the capability is a minimum capability to support only a single active PDSCH TCI state.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication performed by a user equipment (UE), comprising:
   identifying a capability of the UE to support a number of physical downlink shared channel (PDSCH) transmission configuration indicator (TCI) states and a number of control resource set (CORESET) TCI states;
   determining whether a message for PDSCH TCI state activation has been received;
   selecting a first PDSCH TCI state among a plurality of different PDSCH TCI states based at least in part on the identified capability and based at least in part on determining whether the message has been received, wherein:
      the PDSCH TCI state indicated in the message is selected as the first PDSCH TCI state if the message has been received, and
      the first PDSCH TCI state is selected to follow a TCI state of a CORESET configured for the UE or be quasi co-located with the CORESET configured for the UE if the message has not been received; and
   monitoring for a downlink transmission on a downlink data receive beam corresponding to the first PDSCH TCI state.

2. The method of claim 1, wherein the number of PDSCH TCI states comprises a number of PDSCH TCI states active for the downlink transmission.

3. The method of claim 1, wherein the capability indicates a downlink beam determined by a random access procedure and the number of CORESET TCI states determined in connected mode.

4. The method of claim 1, further comprising:
   receiving a configuration message that indicates a plurality of active CORESETs, wherein the first PDSCH TCI state is selected based at least in part on a configured TCI state of a first active CORESET of the plurality of active CORESETs, the first active CORESET having a lowest or highest identifier of a plurality of CORESET identifiers that respectively correspond to the plurality of active CORESETs.

5. The method of claim 1, wherein the message is a medium access control (MAC) control element (CE) for PDSCH TCI activation.

6. The method of claim 1, wherein the first PDSCH TCI state is selected based at least in part on a configured TCI state of a first CORESET of a plurality of CORESETs configured for the UE, the first CORESET having a lowest or highest identifier of a plurality of CORESET identifiers that respectively correspond to the plurality of CORESETs configured for the UE if the message has not been received.

7. The method of claim 1, wherein the first PDSCH TCI state is selected based at least in part on a configured TCI state of a first CORESET of a plurality of CORESETs in a latest monitored transmission time interval, the first CORESET having a lowest or highest identifier of a plurality of CORESET identifiers that respectively correspond to the plurality of CORESETs in the latest monitored transmission time interval if the message has not been received.

8. The method of claim 1, wherein the first PDSCH TCI state is selected based at least in part on a determination that the UE is configured with two different active CORESET TCI states.

9. The method of claim 1, wherein the capability is a minimum capability to support only a single active PDSCH TCI state.

10. A method for wireless communication performed by a base station, comprising:
    receiving a capability indicator of a capability of a user equipment (UE) to support a number of physical downlink shared channel (PDSCH) transmission configuration indicator (TCI) states and a number of control resource set (CORESET) TCI states;
    determining whether to indicate to the UE a first PDSCH TCI state among a plurality of different PDSCH TCI states, the first PDSCH TCI state being based at least in part on the capability;
    responsive to a determination to indicate to the UE the first PDSCH TCI state, transmitting a message to the UE to indicate the first PDSCH TCI state, or
    responsive to a determination not to indicate to the UE the first PDSCH TCI state, selecting the first PDSCH TCI state to follow a TCI state or be quasi co-located with a CORESET configured for the UE; and
    transmitting a downlink transmission on a downlink data transmission beam corresponding to the first PDSCH TCI state.

11. The method of claim 10, wherein the number of PDSCH TCI states comprises a number of PDSCH TCI states active for the downlink transmission.

12. The method of claim 10, wherein the message is a medium access control (MAC) control element (CE) for PDSCH TCI activation.

13. The method of claim 12, wherein the MAC CE includes a TCI state indicator.

14. The method of claim 10, wherein the first PDSCH TCI state follows a configured TCI state of a first CORESET of a plurality of CORESETs configured for the UE, the first CORESET having a lowest or highest identifier of a plurality of CORESET identifiers that respectively correspond to the plurality of CORESETs configured for the UE.

15. The method of claim 10, wherein the first PDSCH TCI state follows a configured TCI state of a first CORESET of a plurality of CORESETs in a latest monitored transmission time interval, the first CORESET having a lowest or highest identifier of a plurality of CORESET identifiers that respectively correspond to the plurality of CORESETs in the latest monitored transmission time interval.

16. The method of claim 10, further comprising configuring the UE with two different active CORESET TCI states, wherein the determining whether to indicate to the UE the first PDSCH TCI state is further based at least in part on configuring the UE with the two different active CORESET TCI states.

17. The method of claim 10, wherein the capability is a minimum capability of the UE to support only a single active PDSCH TCI state.

18. A user equipment (UE) for wireless communication, comprising:
    a memory; and
    one or more processors operatively coupled to the memory, the memory and the one or more processors configured to:
      identify a capability of the UE to support a number of physical downlink shared channel (PDSCH) transmission configuration indicator (TCI) states and a number of control resource set (CORESET) TCI states;
      determine whether a message for PDSCH TCI state activation has been received;
      select a first PDSCH TCI state among a plurality of different PDSCH TCI states based at least in part on the identified capability and based at least in part on determining whether the message has been received, wherein:

the PDSCH TCI state indicated in the message is selected as the first PDSCH TCI state if the message has been received, and the first PDSCH TCI state is selected to follow a TCI state of a CORESET configured for the UE or be quasi co-located with the CORESET configured for the UE if the message has not been received; and monitor for a downlink transmission on a downlink data receive beam corresponding to the first PDSCH TCI state.

19. The UE of claim 18, wherein the number of PDSCH TCI states comprises a number of PDSCH TCI states active for the downlink transmission.

20. The UE of claim 18, wherein the capability indicates a downlink beam determined by a random access procedure and the number of CORESET TCI states determined in connected mode.

21. The UE of claim 18, wherein the UE is further configured to:

receive a configuration message that indicates a plurality of active CORESETs, wherein the first PDSCH TCI state is selected based at least in part on a configured TCI state of a first active CORESET of the plurality of active CORESETs, the first active CORESET having a lowest or highest identifier of a plurality of CORESET identifiers that respectively correspond to the plurality of active CORESETs.

22. The UE of claim 18, wherein the message is a medium access control (MAC) control element (CE) for PDSCH TCI activation.

23. The UE of claim 18, wherein the first PDSCH TCI state is selected based at least in part on a configured TCI state of a first CORESET of a plurality of CORESETs configured for the UE, the first CORESET having a lowest or highest identifier of a plurality of CORESET identifiers that respectively correspond to the plurality of CORESETs configured for the UE if the message is not received.

24. The UE of claim 18, wherein the first PDSCH TCI state is selected based at least in part on a configured TCI state of a first CORESET of a plurality of CORESETs in a latest monitored transmission time interval, the first CORESET having a lowest or highest identifier of a plurality of CORESET identifiers that respectively correspond to the plurality of CORESETs in the latest monitored transmission time interval if the message is not received.

25. The UE of claim 18, wherein the first PDSCH TCI state is selected based at least in part on a determination that the UE is configured with two different active CORESET TCI states.

26. The UE of claim 18, wherein the capability is a minimum capability to support only a single active PDSCH TCI state.

27. A base station for wireless communication, comprising:

a memory; and one or more processors operatively coupled to the memory, the memory and the one or more processors configured to:

receive a capability indicator of a capability of a user equipment (UE) to support a number of physical downlink shared channel (PDSCH) transmission configuration indicator (TCI) states and a number of control resource set (CORESET) TCI states;

determine whether to indicate to the UE a first PDSCH TCI state among a plurality of different PDSCH TCI states, the first PDSCH TCI state being based at least in part on the capability;

responsive to a determination to indicate to the UE the first PDSCH TCI state, transmit a message to the UE to indicate the first PDSCH TCI state, or responsive to a determination not to indicate to the UE the first PDSCH TCI state, select the first PDSCH TCI state to follow a TCI state or be quasi co-located with a CORESET configured for the UE; and transmit a downlink transmission on a downlink data transmission beam corresponding to the first PDSCH TCI state.

28. The base station of claim 27, wherein the message is a medium access control (MAC) control element (CE) for PDSCH TCI activation that includes a TCI state indicator.

29. The base station of claim 27, wherein the base station is configured to determine whether to indicate to the UE the first PDSCH TCI state based at least in part on configuring the UE with two different active CORESET TCI states.

30. The base station of claim 27, wherein the capability is a minimum capability of the UE to support only a single active PDSCH TCI state.

* * * * *